US012687684B2

(12) United States Patent
Tadayon et al.

(10) Patent No.: US 12,687,684 B2
(45) Date of Patent: Jul. 21, 2026

(54) PHOTONICS INTEGRATED CIRCUIT DEVICE PACKAGING

(71) Applicant: Intel Corporation, Santa Clara, CA (US)

(72) Inventors: Pooya Tadayon, Portland, OR (US); Eric J. M. Moret, Beaverton, OR (US); Tarek A. Ibrahim, Mesa, AZ (US); David Shia, Portland, OR (US); Nicholas D. Psaila, Lanark (GB); Russell Childs, Edinburgh (GB)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 17/871,473

(22) Filed: Jul. 22, 2022

(65) Prior Publication Data

US 2024/0027706 A1     Jan. 25, 2024

(51) Int. Cl.
H04B 10/00     (2013.01)
G02B 6/42     (2006.01)
G02B 6/43     (2006.01)

(52) U.S. Cl.
CPC ......... G02B 6/4249 (2013.01); G02B 6/4214 (2013.01); G02B 6/4292 (2013.01); G02B 6/43 (2013.01)

(58) Field of Classification Search
CPC .. G02B 6/4249; G02B 6/4214; G02B 6/4292; G02B 6/43; G02B 6/423; G02B 6/30; G02B 6/4251; G02B 6/4201; G02B 6/4206; G02B 6/424; G02B 6/4274
See application file for complete search history.

(56) References Cited

U.S. PATENT DOCUMENTS

| 10,288,812 | B1 * | 5/2019 | Evans | G02B 6/3636 |
|---|---|---|---|---|
| 11,204,466 | B2 * | 12/2021 | Butler | G02B 6/3652 |
| 12,119,307 | B2 * | 10/2024 | Chou | H01L 24/17 |
| 2014/0203175 | A1 | 7/2014 | Kobrinsky et al. | |
| 2018/0246286 | A1 | 8/2018 | Lohse et al. | |
| 2019/0123109 | A1 * | 4/2019 | Xie | G02B 27/0955 |
| 2019/0137706 | A1 * | 5/2019 | Xie | H10H 20/853 |
| 2021/0055490 | A1 * | 2/2021 | Bennett | G02B 6/368 |
| 2021/0157056 | A1 | 5/2021 | Butler et al. | |
| 2021/0271037 | A1 * | 9/2021 | Brusberg | G02B 6/4228 |
| 2021/0311270 | A1 * | 10/2021 | Goergen | G02B 6/4293 |
| 2022/0159860 | A1 | 5/2022 | Winzer | |
| 2023/0251442 | A1 * | 8/2023 | Meadowcroft | G02B 6/4204 385/139 |

(Continued)

OTHER PUBLICATIONS

EPO Communication Pursuant to Article 94(3) EPC in EP Application Serial No. 23174751.0 mailed on Jul. 10, 2025, 7 pages.

(Continued)

*Primary Examiner* — Agustin Bello
(74) *Attorney, Agent, or Firm* — Alliance IP, LLC

(57)     ABSTRACT

In one embodiment, an integrated circuit device includes a substrate, an electronic integrated circuit (EIC), a photonics integrated circuit (PIC) electrically coupled to the EIC, and a glass block at least partially in a cavity defined by the substrate and at an end of the substrate. The glass block defines an optical path with one or more optical elements to direct light between the PIC and a fiber array unit (FAU) when attached to the glass block.

22 Claims, 15 Drawing Sheets

(56)           References Cited

U.S. PATENT DOCUMENTS

| | | | |
|---|---|---|---|
| 2024/0027706 A1* | 1/2024 | Tadayon | G02B 6/4214 |
| 2024/0027710 A1* | 1/2024 | Li | G02B 6/4206 |
| 2025/0167192 A1* | 5/2025 | Alam | H01L 25/0655 |

OTHER PUBLICATIONS

EPO European Extended Search Report in EP Application Serial No. 23174751.0 mailed on Dec. 19, 2023, 9 pages.

* cited by examiner

1200

1202

PHOTONICS INTEGRATED CIRCUIT DEVICE PACKAGING

BACKGROUND

Off-package input/output (I/O) bandwidth has been steadily increasing, and integrated circuit packaging and I/O technologies need to scale to meet this bandwidth demand. As a result, package pin counts and I/O data rates also continue to increase. However, the reach of electrical I/O circuits (i.e., the length of electrical PCB traces or cables) have reduced with the increased data rates. Additionally, I/O energy efficiency improvement has drastically slowed, which has resulted in a quickly approaching I/O power wall for high-performance packages.

Photonics integrated circuits have shown potential benefits for both power efficiency and bandwidth improvement. Current photonics applications may attach fibers directly to an integrated circuit using v-grooves etched in the Silicon portion of the package as a mechanical alignment datum and use adhesives to permanently embed the fibers within the v-grooves. However, this solution does not allow for rework, e.g., if there are problems with the fiber attach process. As such, if there is an issue in the fiber attach process, the entire assembly has to be scrapped.

DETAILED DESCRIPTION

Embodiments herein provide photonics-based integrated circuit packaging architectures that enable detachable fiber solutions. Such solutions can be enabled through the use of a glass interposer, with a photonics integrated circuit (PIC) being optically coupled to the fiber through the glass interposer, e.g., using waveguides and/or other optical elements within the glass interposer. A fiber array unit (FAU) can attach to the edge of the glass interposer using a suitable mechanical retention system, which can allow the FAU to be attached and reattached.

Typically, an interposer with at least approximately 700 um of thickness is needed to enable these detachable fiber solutions. Current package architectures may utilize a PIC/electronic integrated circuit (EIC) stack that is built onto a glass interposer. However, with such a thickness, the glass interposer may present challenges with respect to drilling fine pitch through glass vias (TGVs) to enable a connection between the PIC/EIC stack and the package substrate, e.g., to connect to bridge circuitry within the substrate that utilizes fine-pitch connections. As such, the glass interposer may require a cavity to enable fine pitch through glass vias (TGVs) to be drilled in the interposer, but an interposer with a deep cavity might not be compatible with other subsequent processes, e.g., those needed to create redistribution layers (RDL) on the interposer.

Embodiments herein may address this or other issues through one or more means. For example, in some embodiments, a glass block may be placed in a cavity within the package substrate, allowing for the EIC to be in direct electrical connection with the fine-pitch regions of a package substrate (e.g., with bridge circuitry within the substrate) and eliminating the need for fine-pitch vias in the glass. As another example, certain embodiments may implement the glass interposer between the EIC and the PIC, which also allows for the EIC to be in direct electrical connection with the fine-pitch regions of a package substrate and eliminates the need for fine-pitch vias in the glass, since the EIC-PIC connection pitch is typically larger than the fine-pitch region of the substrate. As yet another example, certain embodiments may implement the EIC circuitry within bridge circuitry of a package substrate, with the PIC being attached to the EIC/bridge circuitry via a fine-pitch region of the package substrate. A glass interposer may then be located on the PIC, or between the PIC and the EIC/bridge circuitry (if fine-pitch TGVs become practical from a manufacturing perspective).

Figures 1A, 1B, 1C:
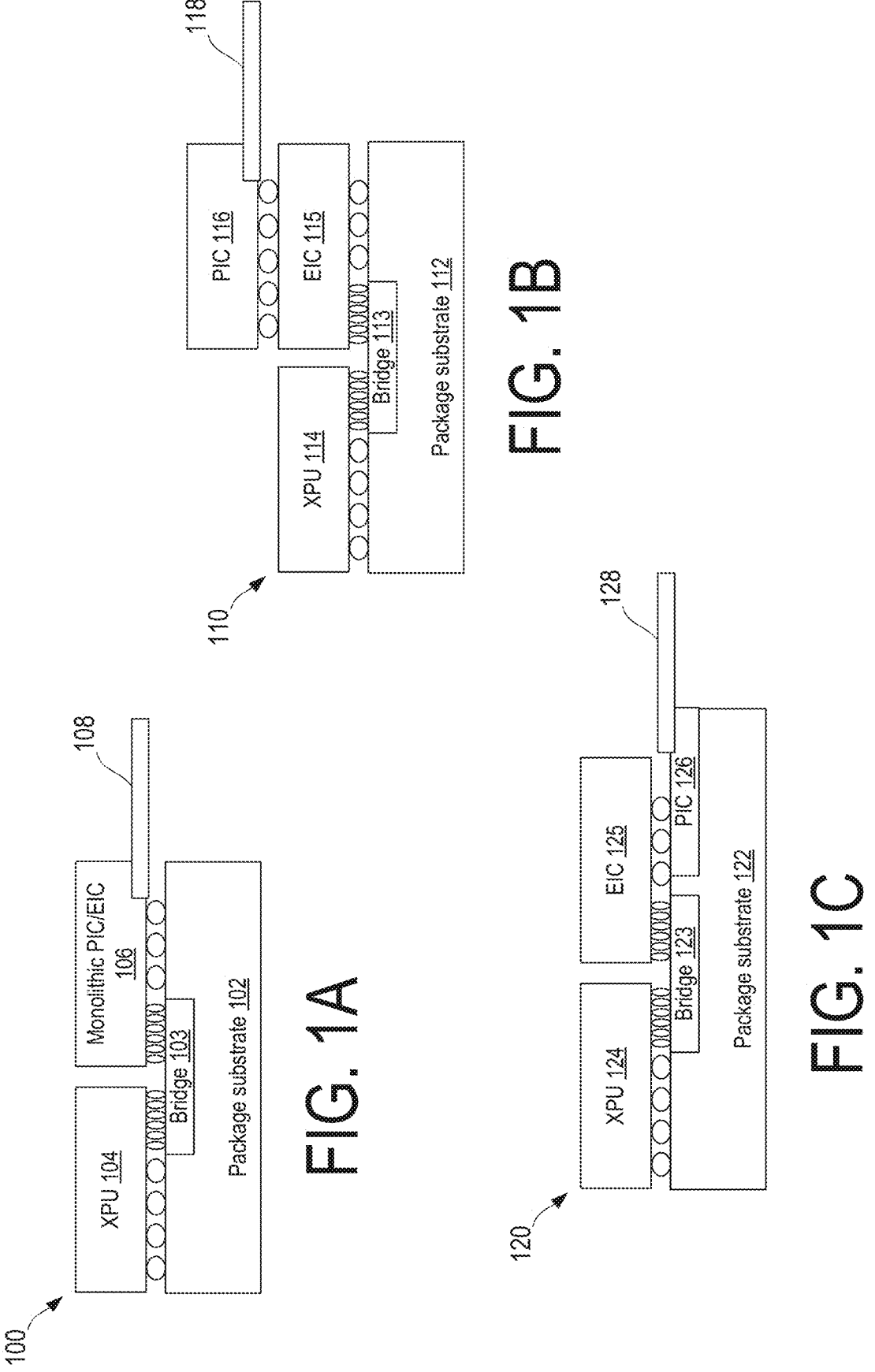
FIGS. 1A-1C illustrate examples of current integrated circuit packages that implement v-groove fiber attachments.

FIGS. 1A-1C illustrate examples of current integrated circuit packages 100, 110, 120 that implement v-groove fiber attachments. In each example shown, the package includes a package substrate (e.g., 102, 112, 122) with embedded bridge circuitry (e.g., 103, 113, 123) that interconnects processing circuitry (XPU) with a photonics integrated circuit (PIC) and an electronic integrated circuit (EIC). The bridge circuitry may be, e.g., an Intel® embedded multi-die interconnect bridge (EMIB) and may include passive and/or active circuitry. Any of the XPU, PIC, and EIC can be manufactured from a wafer, similar to the dies 1202 of FIG. 12, and the XPU may be an integrated circuit device similar to the integrated circuit device 1300 of FIG. 13. The package substrate in each example may provide interconnections between a main circuitry board (e.g., a mother board or main board) and the XPU and/or PIC/EIC.

The example shown in FIG. 1A includes a monolithic PIC/EIC die 106 that is interconnected with an XPU 104 via bridge circuitry 103 in the package substrate 102. The example shown in FIG. 1B includes a PIC die 116 on top of an EIC die 115, with the EIC die 115 being interconnected with the XPU 114 via the bridge circuitry 113 in the package substrate 112. The example shown in FIG. 1C includes a PIC die 126 embedded into the package substrate 122. The PIC die 126 is connected to an EIC die 125 on top of the package substrate 122 and is interconnected with the XPU 124 via bridge circuitry 123. As used herein, a PIC die may also be referred to as a PIC, and an EIC die may also be referred to as an EIC.

The PIC in each example may include circuitry to receive optical signals from a source (e.g., the fiber 108, 118, 128), convert the optical signals to electrical signals, and provide the electrical signals to other circuitry (e.g., to the EIC and/or the XPU). Likewise, the PIC includes circuitry to receive electrical signals (e.g., from the EIC and/or the XPU), generate optical signals based on the electrical signals, and provide the optical signals to the fiber. The PIC may include one or more lasers or other light sources, detectors, amplitude and/or phase modulators, filters, splitters, amplifiers, interferometers, microring resonators, gratings, squeezed or other quantum light sources, etc. The PIC circuitry may perform other functions beyond converting optical signals to electrical signals or vice versa, e.g., matrix multiplication, quantum logic gates, optical compute gates, etc. The EIC may include circuitry to control and/or drive the circuitry within the PIC and/or other electrical circuitry for processing the signals from the PIC. For instance, the EIC may include components such as, for example, transimpedance amplifiers (TIA), serializer/deserializer (SERDES) circuits, driver circuits, etc. The optical signals may be received from an array of fiber, e.g., a fiber pigtail connection, that is coupled to the PIC, e.g., via v-groove connections.

The XPU in each example may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units.

As shown in each example of FIGS. 1A-1C, the pitch (i.e., the distance between the electrical connectors) of the electrical connections between the bridge circuitry and dies of the package (e.g., XPU or EIC) is smaller than the pitch of other electrical connections of the package. In addition, it will be seen that the fiber is attached to the PIC via a traditional v-groove connection, which requires permanently adhering the fiber to the PIC, preventing any rework if needed (e.g., because of a bad fiber attach). To allow for a detachable fiber assembly, a glass interposer may be used.

Figures 2A, 2B:
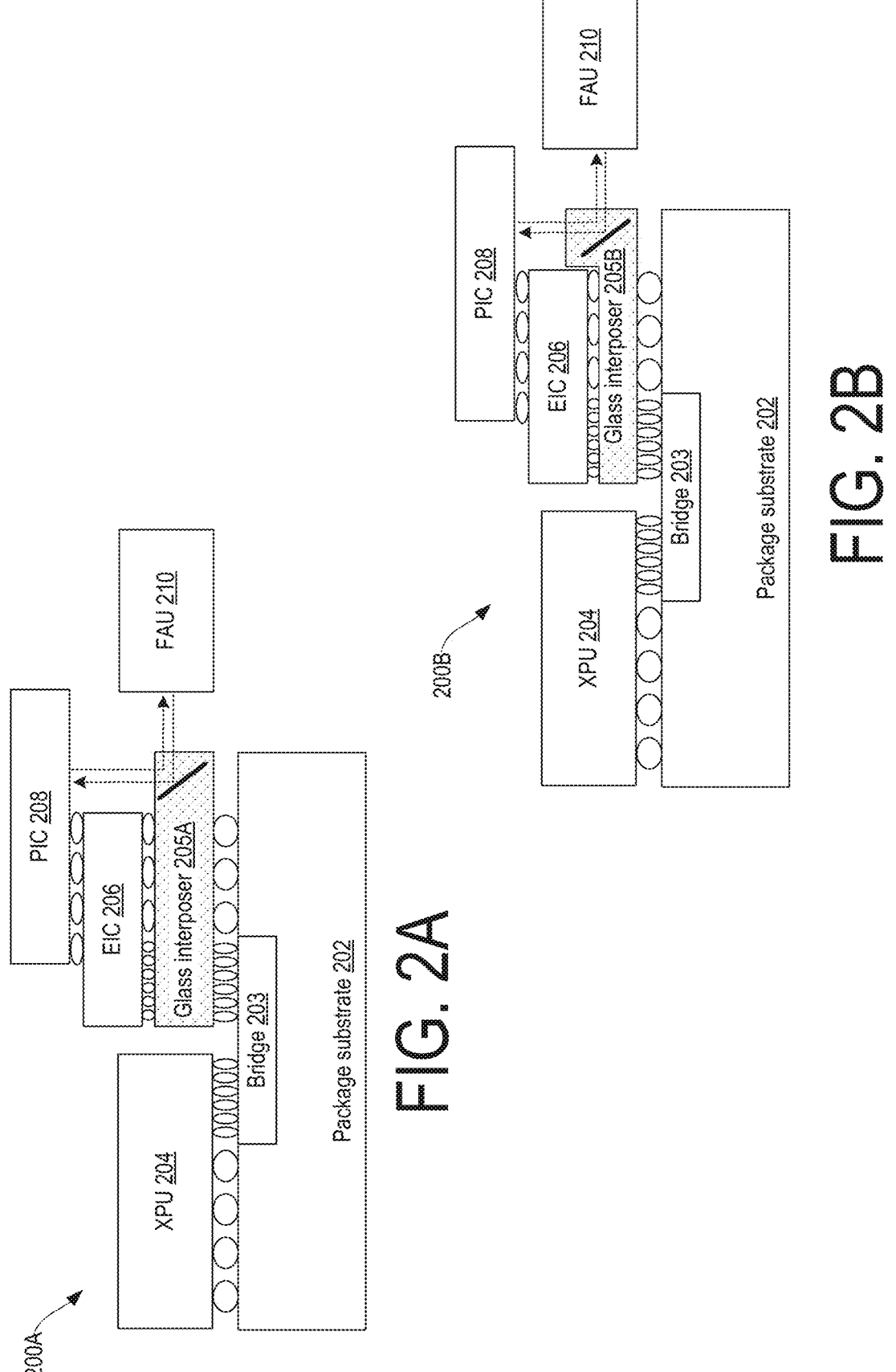
FIGS. 2A-2B illustrate examples of current integrated circuit packages that implement a glass interposer between an EIC/PIC stack and the package substrate.

FIGS. 2A-2B illustrate examples of current integrated circuit packages 200A, 200B that implement a glass interposer between an EIC/PIC stack and the package substrate. Each example package 200 includes a PIC 208 on (and in direct electrical connection with) a EIC 206. The PIC/EIC stack is coupled to the package substrate 202 through a glass interposer 205. The PIC/EIC stack is interconnected with the XPU 204 through the bridge circuitry 203 in the package substrate 202. A fiber array unit (FAU) 210 can attach to the interposer 205 in detachable manner, as described above. Light from the FAU 210 may be directed by one or more optical elements within the interposer toward the PIC 208 as shown. In certain embodiments, the optical elements within the interposer may include one or more of a waveguide (e.g., a laser written waveguide), a mirror, a collimator, a focusing element (e.g., lens), etc.

In the example shown in FIG. 2A, the interposer 205A has a uniform thickness (e.g., between 600-800 um, such as approximately 700 um) across is cross-section, which can present difficulties for drilling TGVs (or make it unfeasible) to enable the fine-pitch electrical connection between the EIC 206 and the bridge circuitry 203, as described above. In contrast, the interposer 205B defines a cavity in which the PIC/EIC stack is located. The cavity effectively reduces the thickness of the interposer 205B in the area in which the PIC/EIC stack is located, which can allow for easier drilling of fine-pitch TGVs through the interposer to enable the fine-pitch electrical connection between the EIC 206 and the bridge circuitry 203. However, as described above, such a cavity might not be compatible with other subsequent processes, e.g., those needed to create redistribution layers (RDL) on the interposer 205. Embodiments of the present disclosure, in contrast, may allow for a full-thickness (i.e., a thickness needed to enable a detachable fiber array unit, which may be approximately 700 um in certain instances) glass interposer (or block) to be used, enabling a detachable fiber solution while also avoiding the issues described above.

Figure 3:
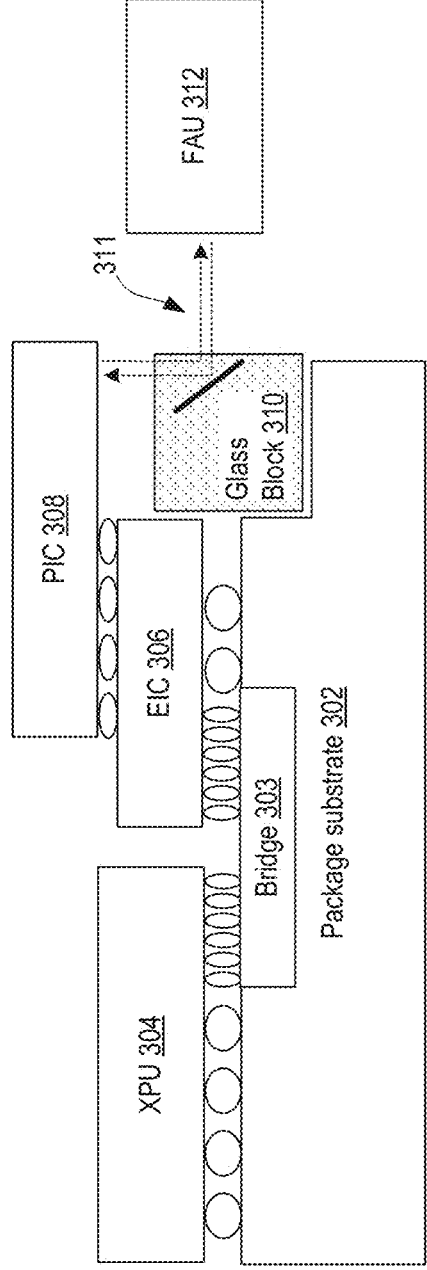
FIG. 3 illustrates an example integrated circuit package with a glass block embedded in the package substrate in accordance with embodiments herein
Figure 3:
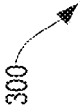
Figures 10A, 10B, 10C:
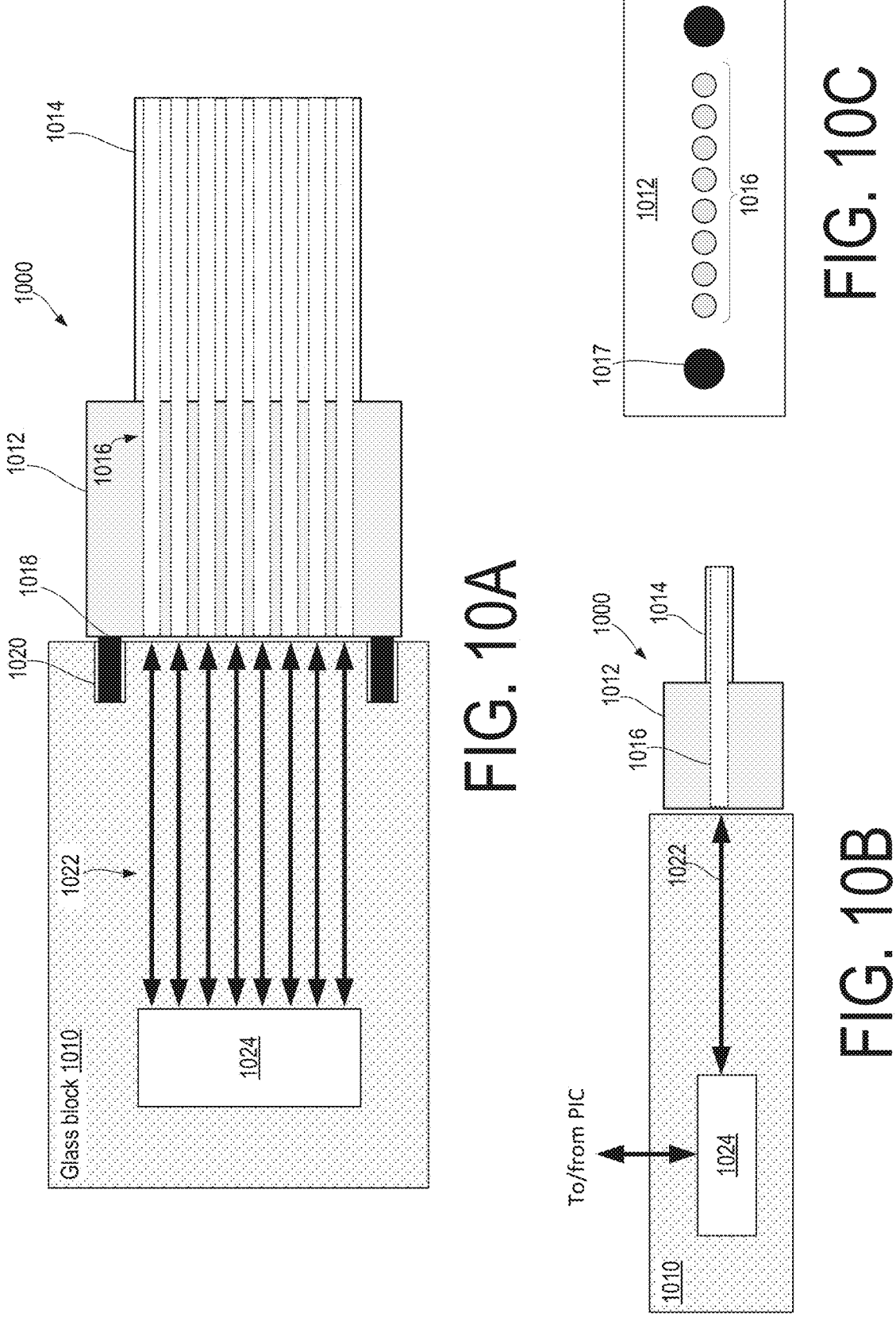
FIGS. 10A-10C illustrate an example detachable FAU coupled to a glass block in accordance with embodiments herein.

FIG. 3 illustrates an example integrated circuit package 300 with a glass block 310 embedded in the package substrate 302 in accordance with embodiments herein. In particular, there is a cavity defined in the package substrate 302 in which the glass block 310 sits. The glass block 310 may include an optical path with one or more optical elements, e.g., waveguide(s), reflectors, mirrors, collimators, focusing elements, etc. For example, the optical path in the glass block 310 may include laser formed optical elements, such as a curved micromirror, a laser written waveguide structure, or a combination thereof. The optical path in the glass block 310 may direct light 311 between the FAU 312 and the PIC 308, which is on and electrically connected to an EIC 306, which in turn is on and electrically connected to the substrate 302. The EIC 306 is electrically interconnected with the XPU 304 through bridge circuitry 303 within the substrate 302, e.g., as described above. The glass block 310 may be thick enough to enable a detachable FAU 312 to connect to the package 300, e.g., may be approximately >=700 um thick, as high aspect ratio/fine pitch TGVs are not required, as in the examples shown in FIGS. 2A-3B. In addition, there is no need to define a cavity within the glass block 310, e.g., as in the example shown in FIG. 2B. The FAU 312 may include male portion(s) that insert into female receptacles of the glass block 310, e.g., as shown in FIGS. 10A-10B. The male portion(s) may include optical fiber(s) that, when the FAU 312 is inserted into the glass block 310, come into alignment with the optical path within the glass block 310.

Figure 4:
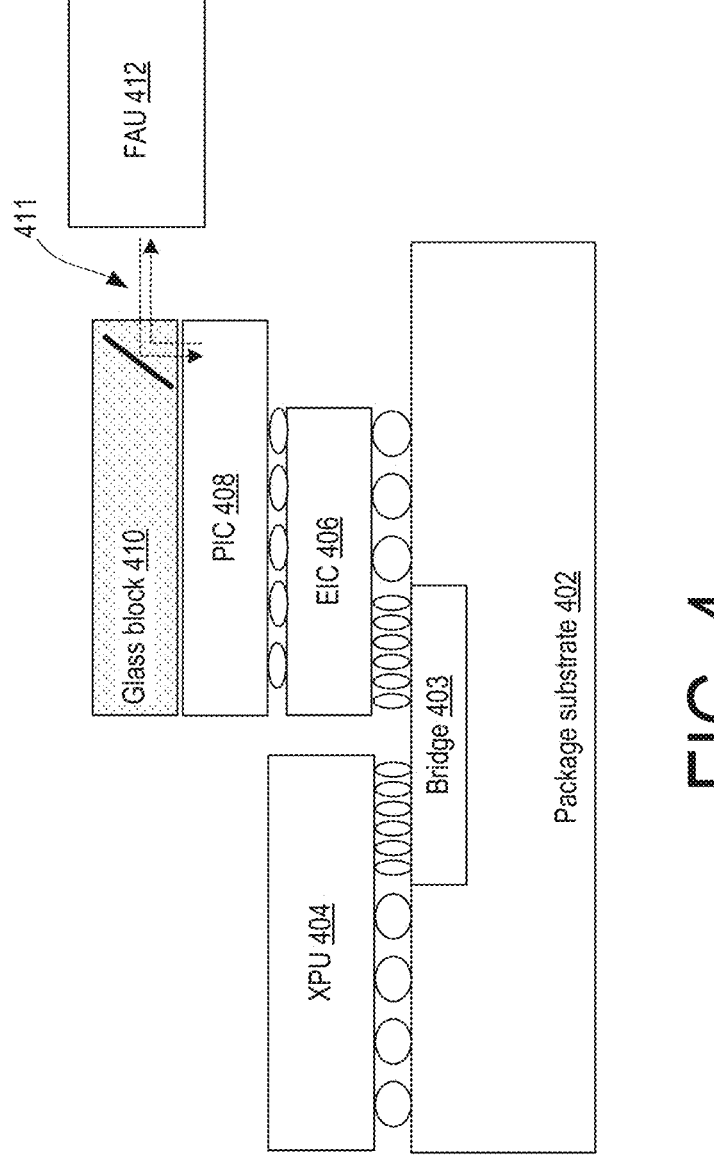
FIG. 4 illustrates an example integrated circuit package with a glass block above a PIC/EIC stack in accordance with embodiments herein.

FIG. 4 illustrates an example integrated circuit package with a glass block 410 above a PIC/EIC stack in accordance with embodiments herein. The glass block 410 may be implemented similar to the glass block 310 of FIG. 3 in that it includes an optical path with one or more optical elements, e.g., laser written waveguide(s), curved micromirrors, collimators, focusing elements, etc. that direct light 411 between the FAU 412 and the PIC 408. The glass block 410 may be thick enough to enable a detachable FAU 412 to connect to the package 400, e.g., may be greater than or equal to approximately 700 um thick, and may include female receptacle(s) similar to the glass block 310 to receive a male portion of the FAU 412. The FAU 412 may be implemented similar to the FAU 312. The PIC 408 is on and electrically connected with the EIC 406, which is on and electrically connected to the substrate 402 and the bridge circuitry 403 within the substrate. The bridge circuitry 403 electrically connects the EIC 406 and the XPU 404 and may include passive and/or active circuitry.

Figure 5:
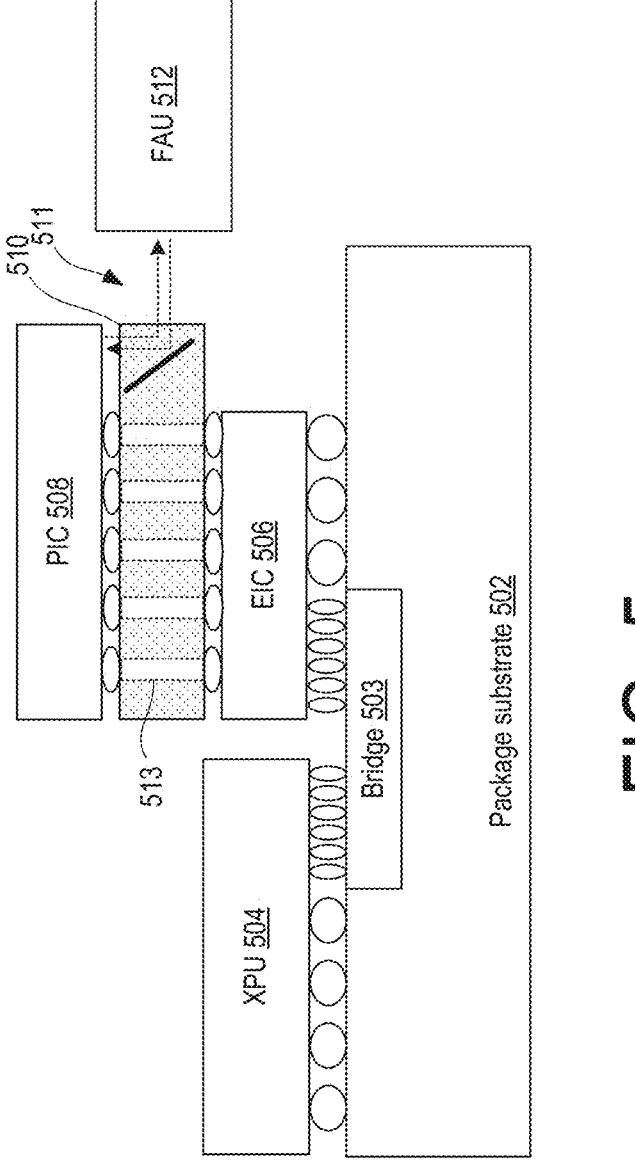
FIG. 5 illustrates an example integrated circuit package with a glass interposer between a PIC and an EIC in accordance with embodiments herein.
Figure 5:

FIG. 5 illustrates an example integrated circuit package 500 with a glass interposer 510 between a PIC 508 and an EIC 506 in accordance with embodiments herein. The glass interposer 510 may be implemented similar to the glass block 310 of FIG. 3 in that it includes an optical path with one or more optical elements, e.g., laser written waveguide (s), curved micromirrors, collimators, focusing elements, etc. that direct light 511 between the FAU 512 and the PIC 508. In addition, the glass interposer 510 may be thick enough to enable a detachable FAU 512 to connect to the package 500, e.g., may be approximately 700 um thick (or greater), and may include female receptacle(s) similar to the glass block 310 to receive a male portion of the FAU 512. The FAU 512 may be implemented similar to the FAU 312 or 412. The glass interposer 510 also includes a number of through glass vias (TGVs) 513 that electrically connect the PIC 508 and the EIC 506. The EIC 506 is electrically connected to the substrate 502, and electrically interconnected with the XPU 504 through bridge circuitry 503 within the substrate 302, e.g., as described above.

Figure 6:
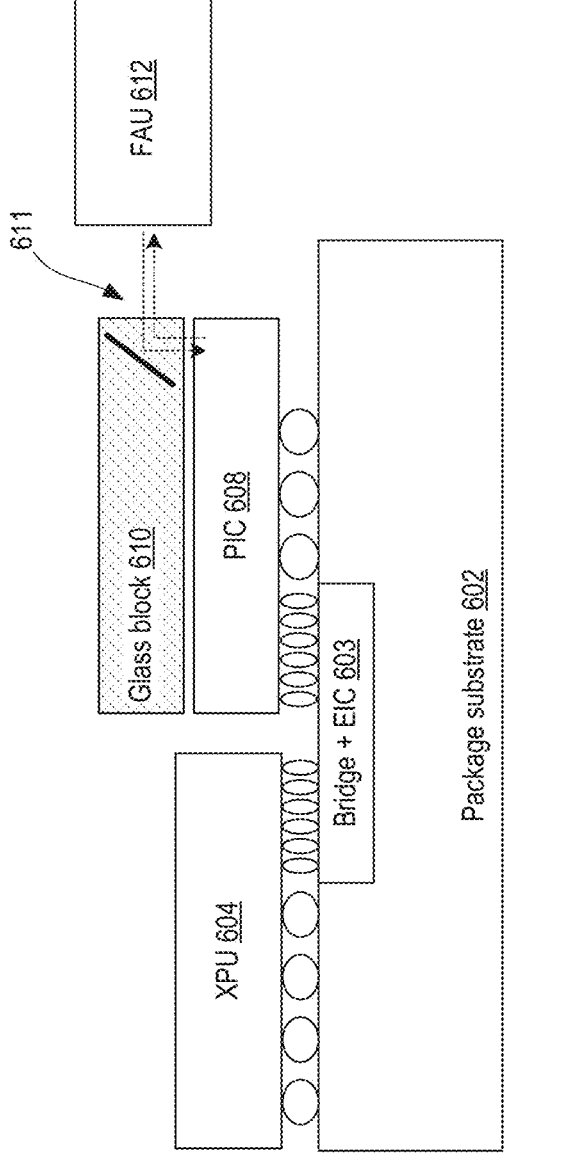
FIGS. 6-7 illustrate example integrated circuit packages that implement an EIC in bridge circuitry within the package substrate in accordance with embodiments herein.
Figure 7:
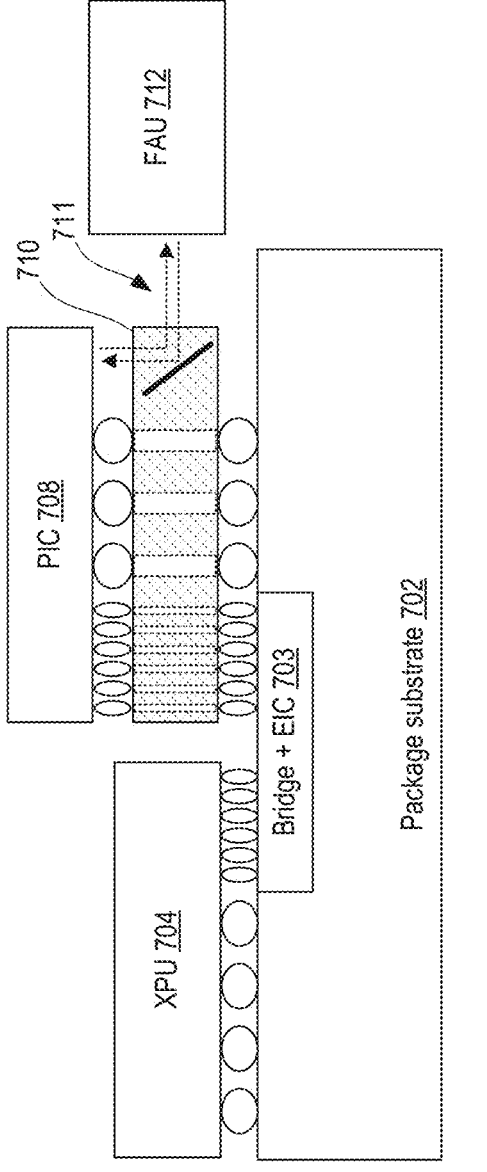

FIGS. 6-7 illustrate example integrated circuit packages that implement an EIC in bridge circuitry within the package substrate in accordance with embodiments herein. In each example, the bridge and EIC circuitry within the package substrate includes the EIC circuitry as described above in addition to passive and/or active circuitry that interconnects the EIC circuitry, the PIC (608, 708), and the XPU (604, 704). Referring to FIG. 6, the example integrated circuit package 600 includes a glass block 610 on a PIC 608, which is on the package substrate 602 and in electrical connection with the bridge and EIC circuitry 603 within the substrate. The PIC 608 is interconnected with the XPU 604 via the bridge and EIC circuitry 603. The glass block 610 may be implemented similar to the glass block 310 of FIG. 3, i.e., it may include an optical path with one or more optical elements, e.g., laser written waveguide(s), curved micromirrors, collimators, focusing elements, etc. that direct light 611 between the FAU 612 and the PIC 608. The FAU 612 may be a detachable FAU, e.g., with male portion(s) that insert into receptacle(s) within the glass block 610, e.g., as shown in FIGS. 10A-10B.

The example integrated circuit package 700 of FIG. 7 is similar to the example shown in FIG. 6, except that it includes a glass interposer 710 between the PIC 708 and the package substrate 702. The glass interposer 710 includes a number of TGVs that electrically connect the PIC 708 with the substrate 702 and the bridge and EIC circuitry 703 within the substrate. As shown, the TGVs may include high aspect ratio/fine pitch TGVs to interconnect the PIC 708 and the bridge and EIC circuitry 703. Similar to the example shown in FIG. 6, the PIC 708 is interconnected with the XPU 704 via the bridge and EIC circuitry 703. The glass interposer 710 may be implemented similar to the glass block 610 of FIG. 6, i.e., it may include an optical path with one or more optical elements, e.g., laser written waveguide(s), curved micromirrors, collimators, focusing elements, etc. that direct light 711 between the FAU 712 and the PIC 708. The FAU 712 may be a detachable FAU, e.g., with male portion(s) that insert into receptacle(s) within the glass interposer 710, e.g., as shown in FIGS. 10A-10B.

Figure 8:
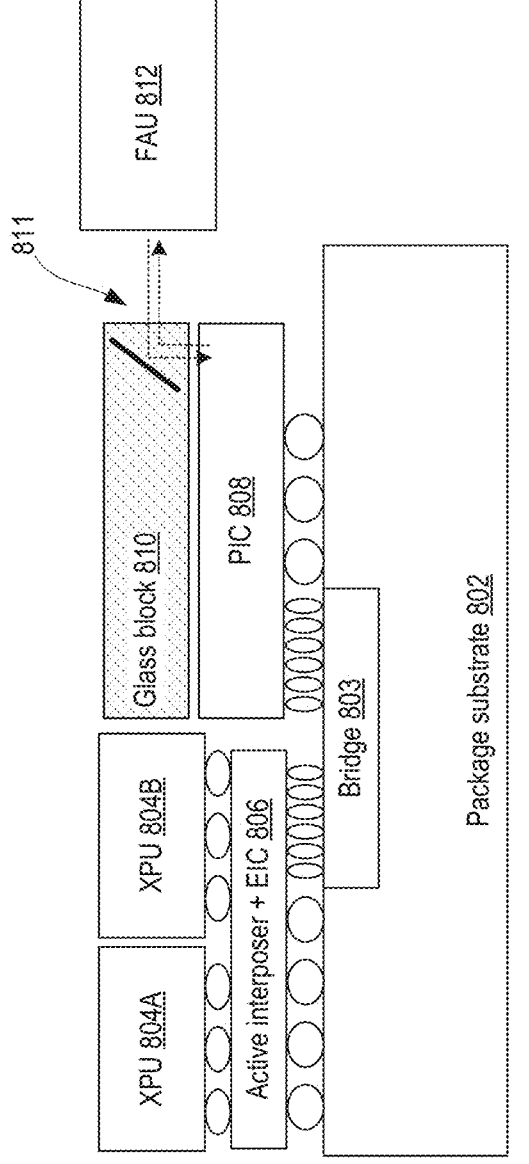
FIGS. 8-9 illustrate example integrated circuit packages that implement an active interposer with EIC circuitry on the other side of the bridge circuitry as the PIC in accordance with embodiments herein.
Figure 9:
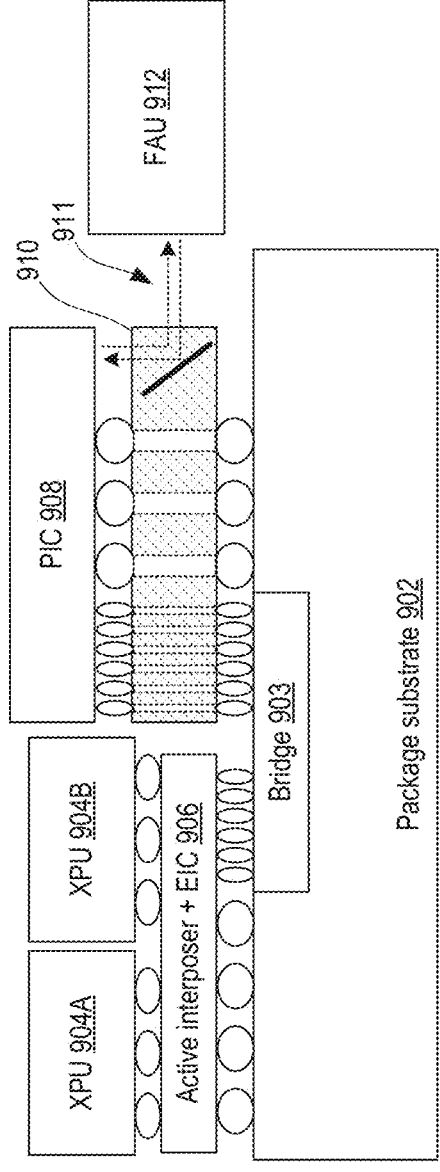

FIGS. 8-9 illustrate example integrated circuit packages that implement an active interposer with EIC circuitry (806, 906) on the other side of the bridge circuitry (803, 903) as the PIC (808, 908) in accordance with embodiments herein. In each example, there are two XPUs (804A/B, 904A/B) on the active interposer with EIC circuitry (806, 906). The active interposer with EIC circuitry (806, 906) includes circuitry to implement the EIC functionality as well as circuitry to interconnect the XPUs, which may include passive and/or active circuitry. The active interposer with EIC circuitry (806, 906) is electrically connected to a PIC (808, 908) through bridge circuitry (803, 903) within the substrate.

Referring to the example shown in FIG. 8, the PIC 808 is on the substrate and there is a glass block 810 on the PIC 808. The glass block 810 may be implemented similar to the glass blocks 310 and 610 of FIGS. 3 and 6, respectively, i.e., it may include an optical path with one or more optical elements, e.g., laser written waveguide(s), curved micromirrors, collimators, focusing elements, etc. that direct light 811 between the FAU 812 and the PIC 808. The FAU 812 may be a detachable FAU, e.g., with male portion(s) that insert into receptacle(s) within the glass block 810, e.g., as shown in FIGS. 10A-10B. The example integrated circuit package 900 of FIG. 9 is similar to the example shown in FIG. 8, except that it includes a glass interposer 910 between the PIC 908 and the package substrate 902. The glass interposer 910 includes a number of TGVs that electrically connect the PIC 908 with the substrate 902 and the bridge circuitry 903 within the substrate. As shown, the TGVs may include high aspect ratio/fine pitch TGVs to interconnect the PIC 908 and the bridge circuitry 903.

FIGS. 10A-10C illustrate an example detachable FAU 1000 coupled to a glass block 1010 in accordance with embodiments herein. In particular, FIG. 10A shows a top view of the coupling, FIG. 10B shows a side view of the coupling, and FIG. 10C shows a face-on view of the FAU 1000. The FAU 1000 includes a connector body 1012 and a ribbon 1014 that house a set of optical fibers 1016. The FAU 1000 also includes alignment/attachment pins 1018 that insert into receptacles 1020 within the glass block 1010 as shown in FIG. 10A. When coupled together, the optical fibers 1016 come into optical alignment with an optical path within the glass block 1010 that directs light between a PIC and the FAU. The optical path in the example shown goes from a first (top) external surface of the glass block (the PIC end) to another (side) external surface, and may include a number of optical elements to direct the light. In the example shown, each optical fiber 1016 butt-couples with a respective waveguide 1022 within the glass block 1010, which run between the mirror 1024 and the external surface of the glass block 1010.

In some embodiments, there may be a gap between the body 1012 and the glass block 1010, e.g., between 1-10 um. In certain embodiments, the glass block and/or the body 1012 may include lenses to help direct light between the waveguides 1022 and the fibers 1016. In the example shown, the optical path in the glass block 1010 also includes a mirror 1024 that reflects the light from the waveguides 1022 toward a PIC, e.g., as described above. The optical path may include other optical elements as well, e.g., collimators or focusing elements. Further, although eight fibers 1016 are shown in the example FAU 1000, an FAU as used herein may include any suitable number of fibers, which may be arranged in the same or different manner as shown in FIGS. 10A-10C.

It will be understood that although each of the examples above show a single FAU, PIC, and EIC, embodiments may include any suitable number of FAUs, PICs, and EIC. For instance, one FAU may provide fiber connections to multiple PICs of an integrated circuit package, or multiple FAUs may provide fiber connections to one PIC. In some embodiments, each PIC may have a corresponding EIC; however, in other embodiments, an EIC may receive signals from multiple PICs, or a PIC may provide signals to multiple EICs. Further, although shown as connecting from the side, the FAUs may connect to the glass blocks/interposers in the examples shown from another angle, e.g., from the top of the glass blocks in the examples shown in FIG. 3, 4, 6, or 8. Still further, although shown as one piece of glass, possibly with TGVs, the glass blocks/interposers can be multiple pieces and/pr may include other elements. For example, in some embodiments, the glass blocks/interposers may include thermal vias (e.g., Cu plugs) or micro fluidics vias to cool the PIC.

Figure 11A:
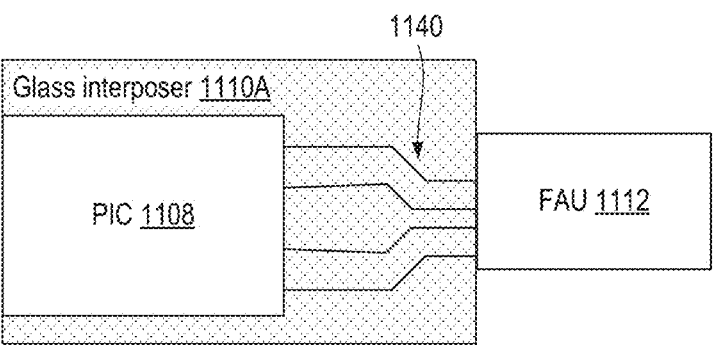
FIGS. 11A-11B illustrate different waveguide and PIC arrangements that may be utilized in embodiments herein.
Figure 11B:
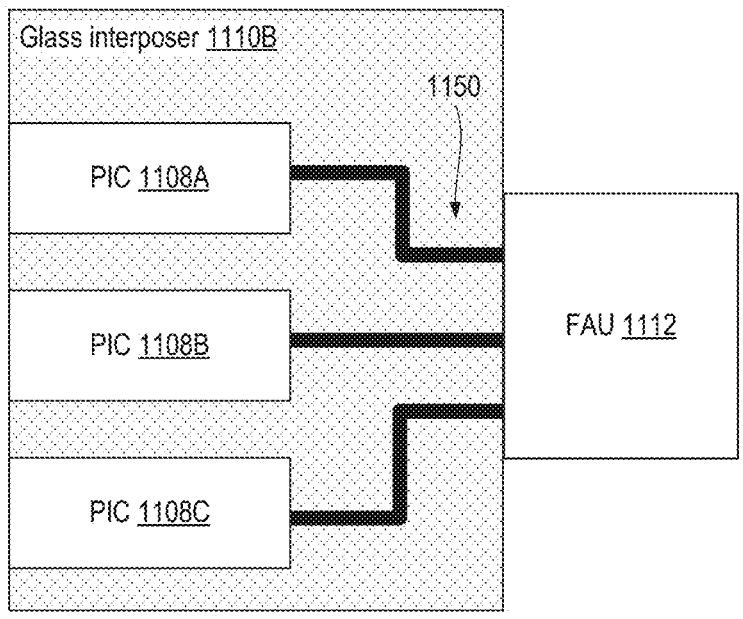

FIGS. 11A-11B illustrate different waveguide and PIC arrangements that may be utilized in embodiments herein. In the example shown in FIG. 11A, the interposer 1110A optically couples a PIC 1108 and an FAU 1112, e.g., as shown in the examples above. The interposer 1110A performs pitch translation for a set of optical signals 1140 (in which each line may be, e.g., an individual waveguides or a bundle of waveguides) transmitted between the FAU 1112 and the PIC 1108. That is, the pitch/distance between the elements providing/receiving the optical signals is smaller at the FAU 1112 (e.g., approximately 50 um apart) than the pitch/distance between the elements providing/receiving the optical signals at the PIC 1108 (e.g., approximately 250 um apart). However, in other embodiments, the pitch translation may be reversed, i.e., may be larger at the FAU 1112 than at the PIC 1108. In the example shown in FIG. 11B, the glass interposer 1110B optically couples an FAU 1112 with multiple PICs 1108, e.g., as shown in the examples above, with each PIC 1108 receiving a respective waveguide or bundle of waveguides 1150 as shown. In certain embodiments, aspects of FIGS. 11A and 11B may be combined, with each optical path of FIG. 11B having a set of waveguides, with each waveguide being pitch translated by the interposer 1110B as shown in FIG. 11A. Other configurations may be implemented with embodiments herein.

Figure 12:
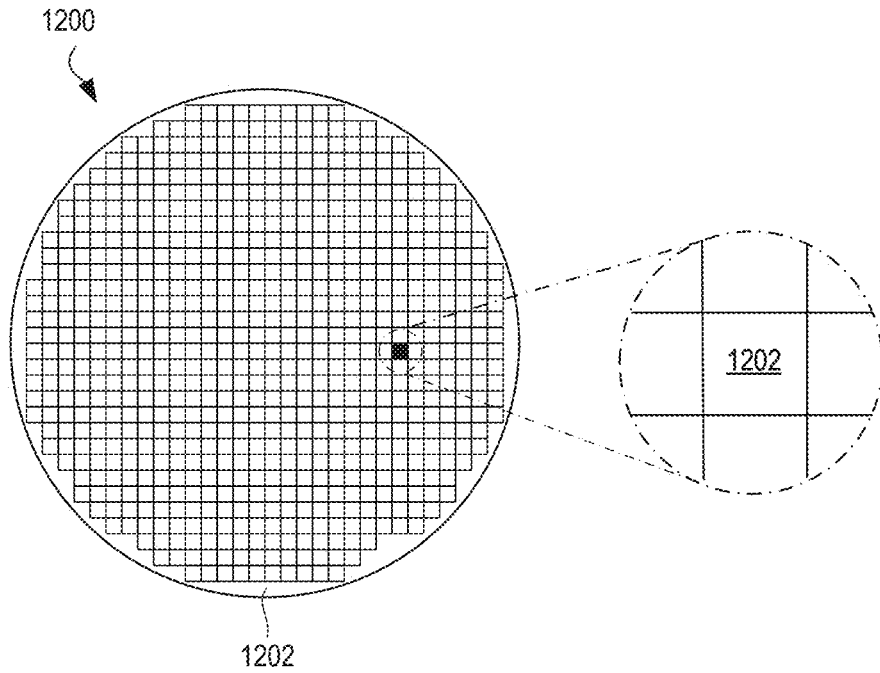
FIG. 12 is a top view of a wafer and dies that may be included in a microelectronic assembly, in accordance with any of the embodiments disclosed herein.

FIG. 12 is a top view of a wafer 1200 and dies 1202 that may be implemented in or along with any of the embodiments disclosed herein. The wafer 1200 may be composed of semiconductor material and may include one or more dies 1202 having integrated circuit structures formed on a surface of the wafer 1200. The individual dies 1202 may be a repeating unit of an integrated circuit product that includes any suitable integrated circuit. After the fabrication of the semiconductor product is complete, the wafer 1200 may undergo a singulation process in which the dies 1202 are separated from one another to provide discrete "chips" of the integrated circuit product. The die 1202 may include one or more transistors (e.g., some of the transistors 1340 of FIG. 13, discussed below), supporting circuitry to route electrical signals to the transistors, passive components (e.g., signal traces, resistors, capacitors, or inductors), and/or any other integrated circuit components. In some embodiments, the wafer 1200 or the die 1202 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 1202. For example, a memory array formed by multiple memory devices may be formed on a same die 1202 as a processor unit (e.g., the processor unit 1502 of FIG. 15) or other logic that is configured to store information in the memory devices or execute instructions stored in the memory array.

Figure 13:
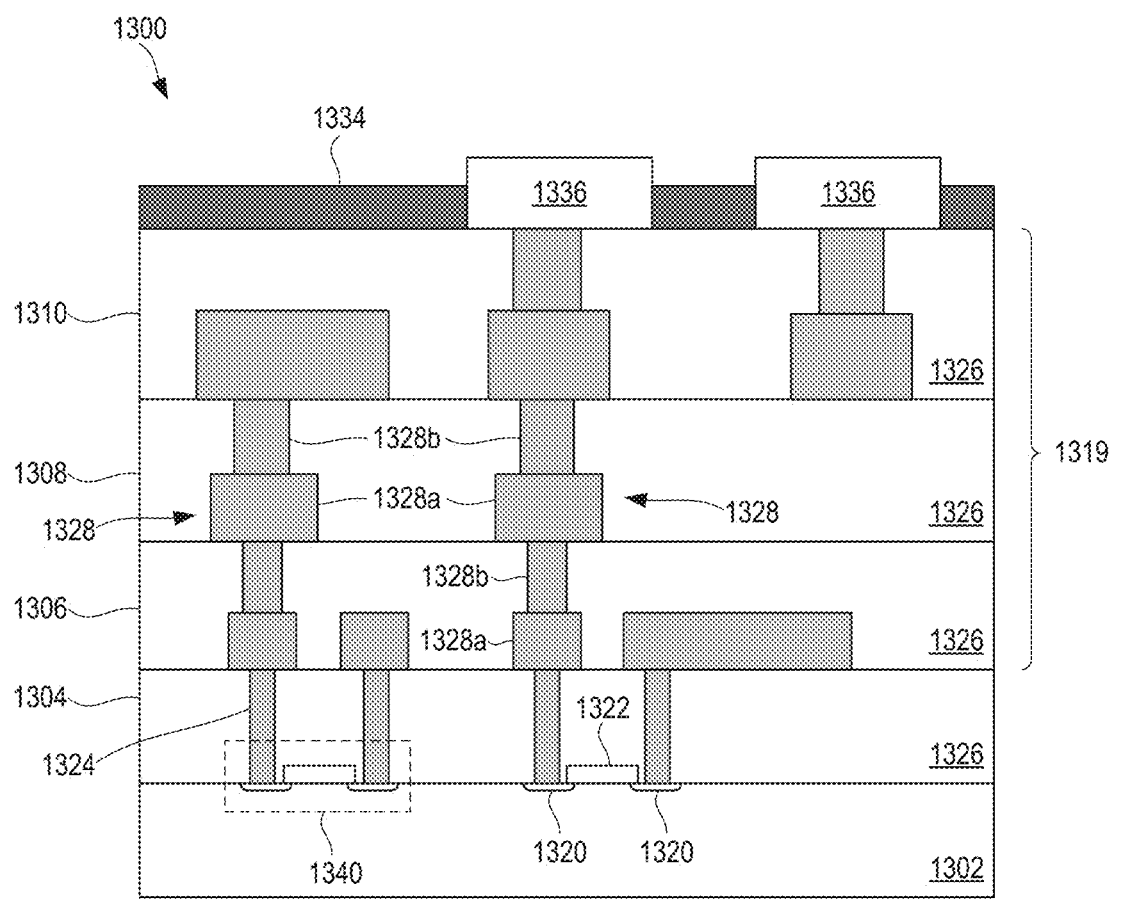
FIG. 13 is a cross-sectional side view of an integrated circuit device that may be included in a microelectronic assembly, in accordance with any of the embodiments disclosed herein.

FIG. 13 is a cross-sectional side view of an integrated circuit device 1300 that may be included in any of the embodiments disclosed herein. One or more of the integrated circuit devices 1300 may be included in one or more dies 1202 (FIG. 12). The integrated circuit device 1300 may be formed on a die substrate 1302 (e.g., the wafer 1200 of FIG. 12) and may be included in a die (e.g., the die 1202 of FIG. 12). The die substrate 1302 may be a semiconductor substrate composed of semiconductor material systems including, for example, n-type or p-type materials systems (or a combination of both). The die substrate 1302 may include, for example, a crystalline substrate formed using a bulk silicon or a silicon-on-insulator (SOI) substructure. In some embodiments, the die substrate 1302 may be formed using alternative materials, which may or may not be combined with silicon, that include, but are not limited to, germanium, indium antimonide, lead telluride, indium arsenide, indium phosphide, gallium arsenide, or gallium antimonide. Further materials classified as group II-VI, III-V, or IV may also be used to form the die substrate 1302. Although a few examples of materials from which the die substrate 1302 may be formed are described here, any material that may serve as a foundation for an integrated circuit device 1300 may be used. The die substrate 1302 may be part of a singulated die (e.g., the dies 1202 of FIG. 12) or a wafer (e.g., the wafer 1200 of FIG. 12).

The integrated circuit device 1300 may include one or more device layers 1304 disposed on the die substrate 1302. The device layer 1304 may include features of one or more transistors 1340 (e.g., metal oxide semiconductor field-effect transistors (MOSFETs)) formed on the die substrate 1302. The transistors 1340 may include, for example, one or more source and/or drain (S/D) regions 1320, a gate 1322 to control current flow between the S/D regions 1320, and one or more S/D contacts 1324 to route electrical signals to/from the S/D regions 1320. The transistors 1340 may include additional features not depicted for the sake of clarity, such as device isolation regions, gate contacts, and the like. The transistors 1340 are not limited to the type and configuration depicted in FIG. 13 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon, nanosheet, or nanowire transistors.

Returning to FIG. 13, a transistor 1340 may include a gate 1322 formed of at least two layers, a gate dielectric and a gate electrode. The gate dielectric may include one layer or a stack of layers. The one or more layers may include silicon oxide, silicon dioxide, silicon carbide, and/or a high-k dielectric material.

The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether the transistor 1340 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 1340 along the source-channel-drain direction, the gate electrode may consist of a U-shaped structure that includes a bottom portion substantially parallel to the surface of the die substrate 1302 and two sidewall portions that are substantially perpendicular to the top surface of the die substrate 1302. In other embodiments, at least one of the metal layers that form the gate electrode may simply be a planar layer that is substantially parallel to the top surface of the die substrate 1302 and does not include sidewall portions substantially perpendicular to the top surface of the die substrate 1302. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 1320 may be formed within the die substrate 1302 adjacent to the gate 1322 of individual transistors 1340. The S/D regions 1320 may be formed using an implantation/diffusion process or an etching/deposition process, for example. In the former process, dopants such as boron, aluminum, antimony, phosphorous, or arsenic may be ion-implanted into the die substrate 1302 to form the S/D regions 1320. An annealing process that activates the dopants and causes them to diffuse farther into the die substrate 1302 may follow the ion-implantation process. In the latter process, the die substrate 1302 may first be etched to form recesses at the locations of the S/D regions 1320. An epitaxial deposition process may then be carried out to fill the recesses with material that is used to fabricate the S/D regions 1320. In some implementations, the S/D regions 1320 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 1320 may be formed using one or more alternate semiconductor materials such as germanium or a group III-V material or alloy. In further embodiments, one or more layers of metal and/or metal alloys may be used to form the S/D regions 1320.

Electrical signals, such as power and/or input/output (I/O) signals, may be routed to and/or from the devices (e.g., transistors 1340) of the device layer 1304 through one or more interconnect layers disposed on the device layer 1304 (illustrated in FIG. 13 as interconnect layers 1306-1310). For example, electrically conductive features of the device layer 1304 (e.g., the gate 1322 and the S/D contacts 1324) may be electrically coupled with the interconnect structures 1328 of the interconnect layers 1306-1310. The one or more interconnect layers 1306-1310 may form a metallization stack (also referred to as an "ILD stack") 1319 of the integrated circuit device 1300.

The interconnect structures 1328 may be arranged within the interconnect layers 1306-1310 to route electrical signals according to a wide variety of designs; in particular, the arrangement is not limited to the particular configuration of interconnect structures 1328 depicted in FIG. 13. Although a particular number of interconnect layers 1306-1310 is depicted in FIG. 13, embodiments of the present disclosure include integrated circuit devices having more or fewer interconnect layers than depicted.

In some embodiments, the interconnect structures 1328 may include lines 1328a and/or vias 1328b filled with an electrically conductive material such as a metal. The lines 1328a may be arranged to route electrical signals in a direction of a plane that is substantially parallel with a surface of the die substrate 1302 upon which the device layer 1304 is formed. For example, the lines 1328a may route electrical signals in a direction in and out of the page and/or in a direction across the page from the perspective of FIG. 13. The vias 1328b may be arranged to route electrical signals in a direction of a plane that is substantially perpendicular to the surface of the die substrate 1302 upon which the device layer 1304 is formed. In some embodiments, the vias 1328b may electrically couple lines 1328a of different interconnect layers 1306-1310 together.

The interconnect layers 1306-1310 may include a dielectric material 1326 disposed between the interconnect structures 1328, as shown in FIG. 13. In some embodiments, dielectric material 1326 disposed between the interconnect structures 1328 in different ones of the interconnect layers 1306-1310 may have different compositions; in other embodiments, the composition of the dielectric material 1326 between different interconnect layers 1306-1310 may be the same. The device layer 1304 may include a dielectric material 1326 disposed between the transistors 1340 and a bottom layer of the metallization stack as well. The dielectric material 1326 included in the device layer 1304 may have a different composition than the dielectric material 1326 included in the interconnect layers 1306-1310; in other embodiments, the composition of the dielectric material 1326 in the device layer 1304 may be the same as a dielectric material 1326 included in any one of the interconnect layers 1306-1310.

A first interconnect layer 1306 (referred to as Metal 1 or "M1") may be formed directly on the device layer 1304. In some embodiments, the first interconnect layer 1306 may include lines 1328a and/or vias 1328b, as shown. The lines 1328a of the first interconnect layer 1306 may be coupled with contacts (e.g., the S/D contacts 1324) of the device layer 1304. The vias 1328b of the first interconnect layer 1306 may be coupled with the lines 1328a of a second interconnect layer 1308.

The second interconnect layer 1308 (referred to as Metal 2 or "M2") may be formed directly on the first interconnect layer 1306. In some embodiments, the second interconnect layer 1308 may include via 1328b to couple the lines 1328 of the second interconnect layer 1308 with the lines 1328a of a third interconnect layer 1310. Although the lines 1328a and the vias 1328b are structurally delineated with a line within individual interconnect layers for the sake of clarity, the lines 1328a and the vias 1328b may be structurally and/or materially contiguous (e.g., simultaneously filled during a dual-damascene process) in some embodiments.

The third interconnect layer 1310 (referred to as Metal 3 or "M3") (and additional interconnect layers, as desired) may be formed in succession on the second interconnect layer 1308 according to similar techniques and configurations described in connection with the second interconnect layer 1308 or the first interconnect layer 1306. In some embodiments, the interconnect layers that are "higher up" in the metallization stack 1319 in the integrated circuit device 1300 (i.e., farther away from the device layer 1304) may be thicker that the interconnect layers that are lower in the metallization stack 1319, with lines 1328a and vias 1328b in the higher interconnect layers being thicker than those in the lower interconnect layers.

The integrated circuit device 1300 may include a solder resist material 1334 (e.g., polyimide or similar material) and one or more conductive contacts 1336 formed on the interconnect layers 1306-1310. In FIG. 13, the conductive contacts 1336 are illustrated as taking the form of bond pads. The conductive contacts 1336 may be electrically coupled with the interconnect structures 1328 and configured to route the electrical signals of the transistor(s) 1340 to external devices. For example, solder bonds may be formed on the one or more conductive contacts 1336 to mechanically and/or electrically couple an integrated circuit die including the integrated circuit device 1300 with another component (e.g., a printed circuit board or a package substrate, e.g., 112). The integrated circuit device 1300 may include additional or alternate structures to route the electrical signals from the interconnect layers 1306-1310; for example, the conductive contacts 1336 may include other analogous features (e.g., posts) that route the electrical signals to external components.

In some embodiments in which the integrated circuit device 1300 is a double-sided die, the integrated circuit device 1300 may include another metallization stack (not shown) on the opposite side of the device layer(s) 1304. This metallization stack may include multiple interconnect layers as discussed above with reference to the interconnect layers 1306-1310, to provide conductive pathways (e.g., including conductive lines and vias) between the device layer(s) 1304 and additional conductive contacts (not shown) on the opposite side of the integrated circuit device 1300 from the conductive contacts 1336.

In other embodiments in which the integrated circuit device 1300 is a double-sided die, the integrated circuit device 1300 may include one or more through silicon vias (TSVs) through the die substrate 1302; these TSVs may make contact with the device layer(s) 1304, and may provide conductive pathways between the device layer(s) 1304 and additional conductive contacts (not shown) on the opposite side of the integrated circuit device 1300 from the conductive contacts 1336. In some embodiments, TSVs extending through the substrate can be used for routing power and ground signals from conductive contacts on the opposite side of the integrated circuit device 1300 from the conductive contacts 1336 to the transistors 1340 and any other components integrated into the die 1300, and the metallization stack 1319 can be used to route I/O signals from the conductive contacts 1336 to transistors 1340 and any other components integrated into the die 1300.

Multiple integrated circuit devices 1300 may be stacked with one or more TSVs in the individual stacked devices providing connection between one of the devices to any of the other devices in the stack. For example, one or more high-bandwidth memory (HBM) integrated circuit dies can be stacked on top of a base integrated circuit die and TSVs in the HBM dies can provide connection between the individual HBM and the base integrated circuit die. Conductive contacts can provide additional connections between adjacent integrated circuit dies in the stack. In some embodiments, the conductive contacts can be fine-pitch solder bumps (microbumps).

Figure 14:
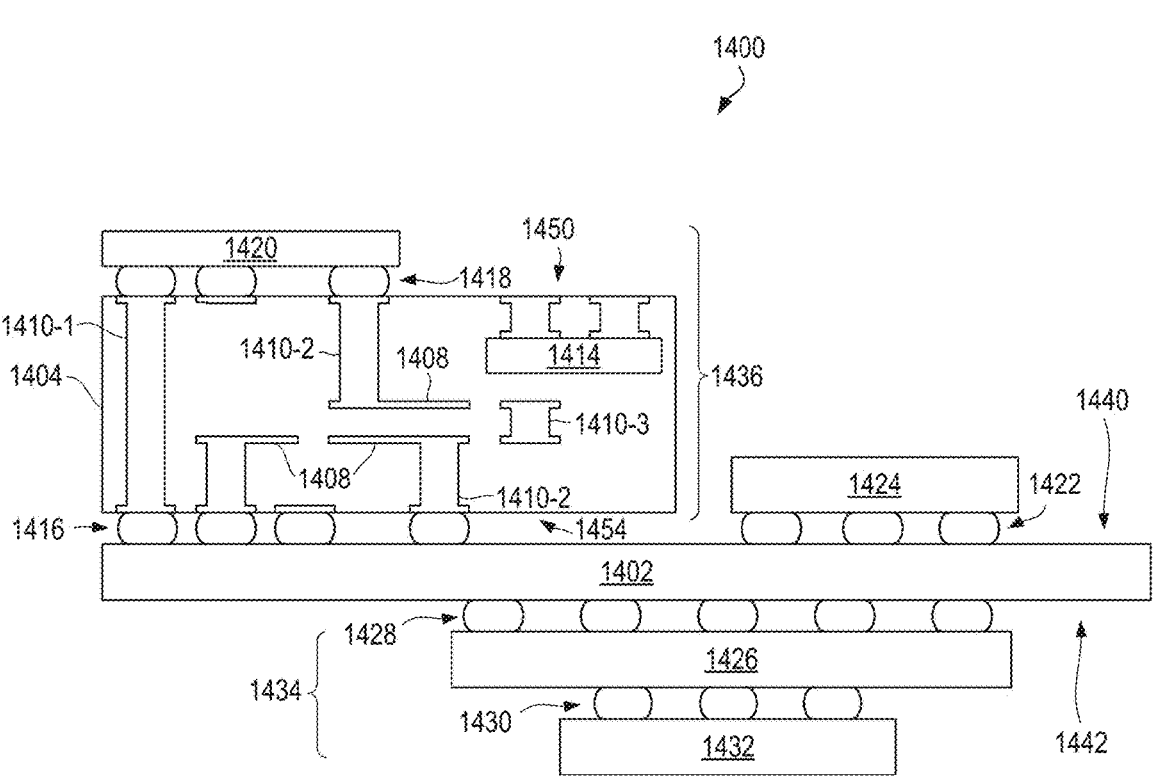
FIG. 14 is a cross-sectional side view of an integrated circuit device assembly that may include embodiments disclosed herein.

FIG. 14 is a cross-sectional side view of an integrated circuit device assembly 1400 that may include any of the embodiments disclosed herein. The integrated circuit device assembly 1400 includes a number of components disposed on a circuit board 1402 (which may be a motherboard, system board, mainboard, etc.). The integrated circuit device assembly 1400 includes components disposed on a first face 1440 of the circuit board 1402 and an opposing second face 1442 of the circuit board 1402; generally, components may be disposed on one or both faces 1440 and 1442.

In some embodiments, the circuit board 1402 may be a printed circuit board (PCB) including multiple metal (or interconnect) layers separated from one another by layers of dielectric material and interconnected by electrically conductive vias. The individual metal layers comprise conductive traces. Any one or more of the metal layers may be formed in a desired circuit pattern to route electrical signals (optionally in conjunction with other metal layers) between the components coupled to the circuit board 1402. In other embodiments, the circuit board 1402 may be a non-PCB substrate. The integrated circuit device assembly 1400 illustrated in FIG. 14 includes a package-on-interposer structure 1436 coupled to the first face 1440 of the circuit board 1402 by coupling components 1416. The coupling components 1416 may electrically and mechanically couple the package-on-interposer structure 1436 to the circuit board 1402, and may include solder balls (as shown in FIG. 14), pins (e.g., as part of a pin grid array (PGA), contacts (e.g., as part of a land grid array (LGA)), male and female portions of a socket, an adhesive, an underfill material, and/or any other suitable electrical and/or mechanical coupling structure.

The package-on-interposer structure 1436 may include an integrated circuit component 1420 coupled to an interposer 1404 by coupling components 1418. The coupling components 1418 may take any suitable form for the application, such as the forms discussed above with reference to the coupling components 1416. Although a single integrated circuit component 1420 is shown in FIG. 14, multiple integrated circuit components may be coupled to the interposer 1404; indeed, additional interposers may be coupled to the interposer 1404. The interposer 1404 may provide an intervening substrate used to bridge the circuit board 1402 and the integrated circuit component 1420.

The integrated circuit component 1420 may be a packaged or unpacked integrated circuit product that includes one or more integrated circuit dies (e.g., the die 1202 of FIG. 12, the integrated circuit device 1300 of FIG. 13) and/or one or more other suitable components. A packaged integrated circuit component comprises one or more integrated circuit dies mounted on a package substrate with the integrated circuit dies and package substrate encapsulated in a casing material, such as a metal, plastic, glass, or ceramic. In one example of an unpackaged integrated circuit component 1420, a single monolithic integrated circuit die comprises solder bumps attached to contacts on the die. The solder bumps allow the die to be directly attached to the interposer 1404. The integrated circuit component 1420 can comprise one or more computing system components, such as one or more processor units (e.g., system-on-a-chip (SoC), processor core, graphics processor unit (GPU), accelerator, chipset processor), I/O controller, memory, or network interface controller. In some embodiments, the integrated circuit component 1420 can comprise one or more additional active or passive devices such as capacitors, decoupling capacitors, resistors, inductors, fuses, diodes, transformers, sensors, electrostatic discharge (ESD) devices, and memory devices.

In embodiments where the integrated circuit component 1420 comprises multiple integrated circuit dies, they dies can be of the same type (a homogeneous multi-die integrated circuit component) or of two or more different types (a heterogeneous multi-die integrated circuit component). A multi-die integrated circuit component can be referred to as a multi-chip package (MCP) or multi-chip module (MCM).

In addition to comprising one or more processor units, the integrated circuit component 1420 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets". In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Generally, the interposer 1404 may spread connections to a wider pitch or reroute a connection to a different connection. For example, the interposer 1404 may couple the integrated circuit component 1420 to a set of ball grid array (BGA) conductive contacts of the coupling components 1416 for coupling to the circuit board 1402. In the embodiment illustrated in FIG. 14, the integrated circuit component 1420 and the circuit board 1402 are attached to opposing sides of the interposer 1404; in other embodiments, the integrated circuit component 1420 and the circuit board 1402 may be attached to a same side of the interposer 1404. In some embodiments, three or more components may be interconnected by way of the interposer 1404.

In some embodiments, the interposer 1404 may be formed as a PCB, including multiple metal layers separated from one another by layers of dielectric material and interconnected by electrically conductive vias. In some embodiments, the interposer 1404 may be formed of an epoxy resin, a fiberglass-reinforced epoxy resin, an epoxy resin with inorganic fillers, a ceramic material, or a polymer material such as polyimide. In some embodiments, the interposer 1404 may be formed of alternate rigid or flexible materials that may include the same materials described above for use in a semiconductor substrate, such as silicon, germanium, and other group III-V and group IV materials. The interposer 1404 may include metal interconnects 1408 and vias 1410, including but not limited to through hole vias 1410-1 (that extend from a first face 1450 of the interposer 1404 to a second face 1454 of the interposer 1404), blind vias 1410-2 (that extend from the first or second faces 1450 or 1454 of the interposer 1404 to an internal metal layer), and buried vias 1410-3 (that connect internal metal layers).

In some embodiments, the interposer 1404 can comprise a silicon interposer. Through silicon vias (TSV) extending through the silicon interposer can connect connections on a first face of a silicon interposer to an opposing second face of the silicon interposer. In some embodiments, an interposer 1404 comprising a silicon interposer can further comprise one or more routing layers to route connections on a first face of the interposer 1404 to an opposing second face of the interposer 1404.

The interposer 1404 may further include embedded devices 1414, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 1404. The package-on-interposer structure 1436 may take the form of any of the package-on-interposer structures known in the art. In embodiments where the interposer is a non-printed circuit board The integrated circuit device assembly 1400 may include an integrated circuit component 1424 coupled to the first face 1440 of the circuit board 1402 by coupling components 1422. The coupling components 1422 may take the form of any of the embodiments discussed above with reference to the coupling components 1416, and the integrated circuit component 1424 may take the form of any of the embodiments discussed above with reference to the integrated circuit component 1420.

The integrated circuit device assembly 1400 illustrated in FIG. 14 includes a package-on-package structure 1434 coupled to the second face 1442 of the circuit board 1402 by coupling components 1428. The package-on-package structure 1434 may include an integrated circuit component 1426 and an integrated circuit component 1432 coupled together by coupling components 1430 such that the integrated circuit component 1426 is disposed between the circuit board 1402 and the integrated circuit component 1432. The coupling components 1428 and 1430 may take the form of any of the embodiments of the coupling components 1416 discussed above, and the integrated circuit components 1426 and 1432 may take the form of any of the embodiments of the integrated circuit component 1420 discussed above. The package-on-package structure 1434 may be configured in accordance with any of the package-on-package structures known in the art.

Figure 15:
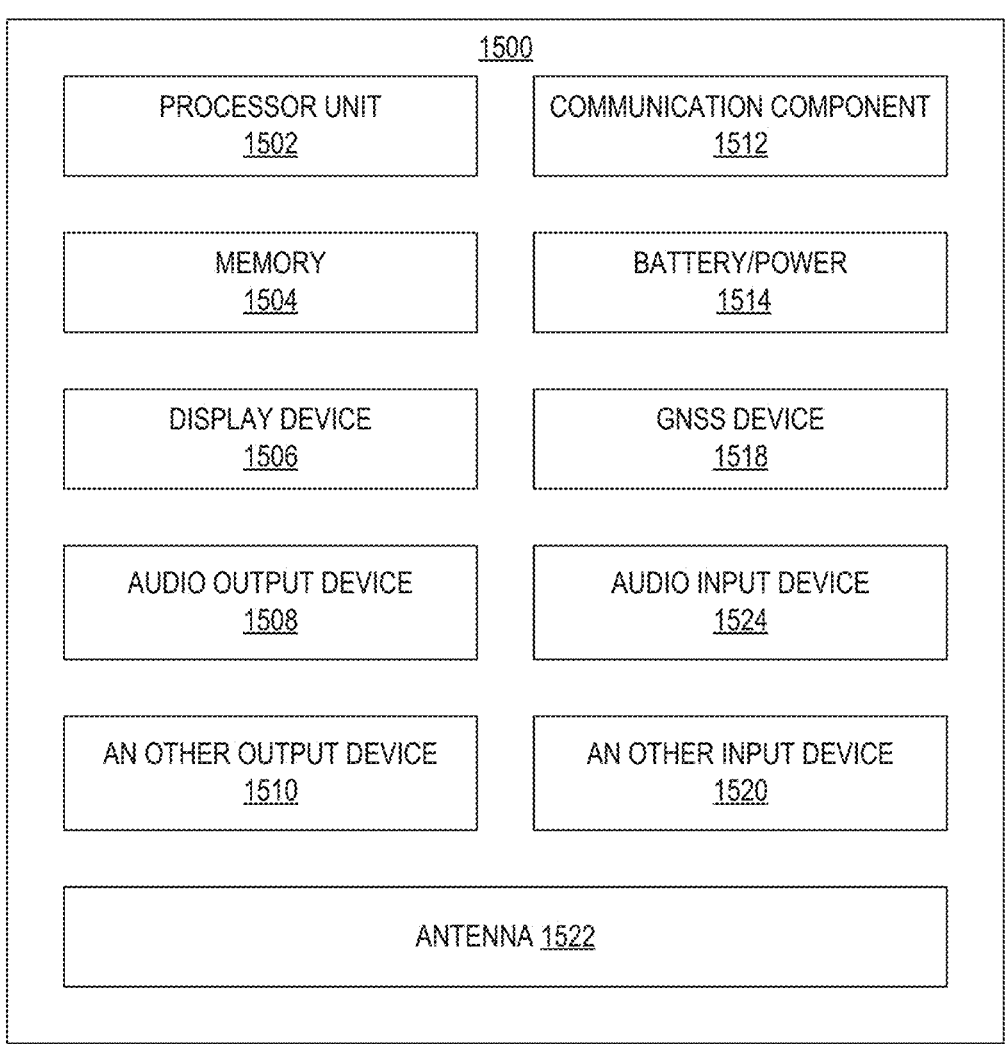
FIG. 15 is a block diagram of an example electrical device that may include a microelectronic assembly, in accordance with any of the embodiments disclosed herein.

FIG. 15 is a block diagram of an example electrical device 1500 that may include one or more of the embodiments disclosed herein. For example, any suitable ones of the components of the electrical device 1500 may include one or more of assemblies, integrated circuit devices 1300, or integrated circuit dies 1202 disclosed herein. A number of components are illustrated in FIG. 15 as included in the electrical device 1500, but any one or more of these components may be omitted or duplicated, as suitable for the application. In some embodiments, some or all of the components included in the electrical device 1500 may be attached to one or more motherboards mainboards, or system boards. In some embodiments, one or more of these components are fabricated onto a single system-on-a-chip (SoC) die.

Additionally, in various embodiments, the electrical device 1500 may not include one or more of the components illustrated in FIG. 15, but the electrical device 1500 may include interface circuitry for coupling to the one or more components. For example, the electrical device 1500 may not include a display device 1506, but may include display device interface circuitry (e.g., a connector and driver circuitry) to which a display device 1506 may be coupled. In another set of examples, the electrical device 1500 may not include an audio input device 1524 or an audio output device 1508, but may include audio input or output device interface circuitry (e.g., connectors and supporting circuitry) to which an audio input device 1524 or audio output device 1508 may be coupled.

The electrical device 1500 may include one or more processor units 1502 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 1502 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

The electrical device 1500 may include a memory 1504, which may itself include one or more memory devices such as volatile memory (e.g., dynamic random access memory (DRAM), static random-access memory (SRAM)), non-volatile memory (e.g., read-only memory (ROM), flash memory, chalcogenide-based phase-change non-voltage memories), solid state memory, and/or a hard drive. In some embodiments, the memory 1504 may include memory that is located on the same integrated circuit die as the processor unit 1502. This memory may be used as cache memory (e.g., Level 1 (L1), Level 2 (L2), Level 3 (L3), Level 4 (L4), Last Level Cache (LLC)) and may include embedded dynamic random access memory (eDRAM) or spin transfer torque magnetic random access memory (STT-MRAM).

In some embodiments, the electrical device 1500 can comprise one or more processor units 1502 that are heterogeneous or asymmetric to another processor unit 1502 in the electrical device 1500. There can be a variety of differences between the processing units 1502 in a system in terms of a spectrum of metrics of merit including architectural, micro-architectural, thermal, power consumption characteristics, and the like. These differences can effectively manifest themselves as asymmetry and heterogeneity among the processor units 1502 in the electrical device 1500.

In some embodiments, the electrical device 1500 may include a communication component 1512 (e.g., one or more communication components). For example, the communication component 1512 can manage wireless communications for the transfer of data to and from the electrical device 1500. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 1512 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 1512 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 1512 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 1512 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 1512 may operate in accordance with other wireless protocols in other embodiments. The electrical device 1500 may include an antenna 1522 to facilitate wireless communications and/or to receive other wireless communications (such as AM or FM radio transmissions).

In some embodiments, the communication component 1512 may manage wired communications, such as electrical, optical, or any other suitable communication protocols (e.g., IEEE 802.3 Ethernet standards). As noted above, the communication component 1512 may include multiple communication components. For instance, a first communication component 1512 may be dedicated to shorter-range wireless communications such as Wi-Fi or Bluetooth, and a second communication component 1512 may be dedicated to longer-range wireless communications such as global positioning system (GPS), EDGE, GPRS, CDMA, WiMAX, LTE, EV-DO, or others. In some embodiments, a first communication component 1512 may be dedicated to wireless communications, and a second communication component 1512 may be dedicated to wired communications.

The electrical device 1500 may include battery/power circuitry 1514. The battery/power circuitry 1514 may include one or more energy storage devices (e.g., batteries or capacitors) and/or circuitry for coupling components of the electrical device 1500 to an energy source separate from the electrical device 1500 (e.g., AC line power).

The electrical device 1500 may include a display device 1506 (or corresponding interface circuitry, as discussed above). The display device 1506 may include one or more embedded or wired or wirelessly connected external visual indicators, such as a heads-up display, a computer monitor, a projector, a touchscreen display, a liquid crystal display (LCD), a light-emitting diode display, or a flat panel display.

The electrical device 1500 may include an audio output device 1508 (or corresponding interface circuitry, as discussed above). The audio output device 1508 may include any embedded or wired or wirelessly connected external device that generates an audible indicator, such speakers, headsets, or earbuds.

The electrical device 1500 may include an audio input device 1524 (or corresponding interface circuitry, as discussed above). The audio input device 1524 may include any embedded or wired or wirelessly connected device that generates a signal representative of a sound, such as microphones, microphone arrays, or digital instruments (e.g., instruments having a musical instrument digital interface (MIDI) output). The electrical device 1500 may include a Global Navigation Satellite System (GNSS) device 1518 (or corresponding interface circuitry, as discussed above), such as a Global Positioning System (GPS) device. The GNSS device 1518 may be in communication with a satellite-based system and may determine a geolocation of the electrical device 1500 based on information received from one or more GNSS satellites, as known in the art.

The electrical device 1500 may include another output device 1510 (or corresponding interface circuitry, as discussed above). Examples of the other output device 1510 may include an audio codec, a video codec, a printer, a wired or wireless transmitter for providing information to other devices, or an additional storage device.

The electrical device 1500 may include another input device 1520 (or corresponding interface circuitry, as discussed above). Examples of the other input device 1520 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electrical device 1500 may have any desired form factor, such as a hand-held or mobile electrical device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra mobile personal computer, a portable gaming console, etc.), a desktop electrical device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electrical device or an embedded computing system (e.g., computing systems that are part of a vehicle, smart home appliance, consumer electronics product or equipment, manufacturing equipment). In some embodiments, the electrical device 1500 may be any other electronic device that processes data. In some embodiments, the electrical device 1500 may comprise multiple discrete physical components. Given the range of devices that the electrical device 1500 can be manifested as in various embodiments, in some embodiments, the electrical device 1500 can be referred to as a computing device or a computing system.

Illustrative examples of the technologies described throughout this disclosure are provided below. Embodiments of these technologies may include any one or more, and any combination of, the examples described below. In some embodiments, at least one of the systems or components set forth in one or more of the preceding figures may be configured to perform one or more operations, techniques, processes, and/or methods as set forth in the following examples.

Example A1 is an integrated circuit device comprising: a substrate; an electronic integrated circuit (EIC); a photonics integrated circuit (PIC) electrically coupled to the EIC; and a glass block at least partially in a cavity defined by the substrate, the glass block defining an optical path with one or more optical elements to direct light between the PIC and an external surface of the glass block.

Example A2 includes the subject matter of Example A1, wherein a bottom side of the EIC is coupled to a top side of the substrate, and a bottom side of the PIC is coupled to a top side of the EIC.

Example A3 includes the subject matter of Example A1 or A2, further comprising bridge circuitry in the substrate to interconnect the EIC and other components of the integrated circuit device.

Example A4 includes the subject matter of Example A3, wherein a distance between connectors electrically coupling the EIC and the bridge circuitry is less than a distance between connectors electrically coupling the EIC and the PIC.

Example A5 includes the subject matter of Example A3 or A4, further comprising a processor electrically coupled to the EIC via the bridge circuitry.

Example A6 includes the subject matter of any one of Examples A1-A5, wherein the optical elements of the glass block comprise one or more of a waveguide, a mirror, a collimator, and a focusing element.

Example A7 includes the subject matter of any one of Examples A1-A6, wherein the glass block comprises one or more receptacles to receive guide pins of a detachable fiber array unit.

Example A8 includes the subject matter of any one of Examples A1-A7, wherein the glass block is at least 600 um thick.

Example A9 is an integrated circuit package comprising: a package substrate; an electronic integrated circuit (EIC) coupled to the package substrate; a photonics integrated circuit (PIC) electrically coupled to the EIC; and a glass block at least partially in a cavity defined by the package substrate, the glass block defining an optical path with one or more optical elements to direct light between the PIC and an external surface of the glass block; and a processor electrically coupled to the EIC.

Example A10 includes the subject matter of Example A9, wherein a bottom side of the EIC is coupled to a top side of the substrate, and a bottom side of the PIC is coupled to a top side of the EIC.

Example A11 includes the subject matter of Example A9 or A10, further comprising bridge circuitry in the package substrate to electrically couple the EIC and the processor.

Example A12 includes the subject matter of Example A11, wherein a distance between connectors electrically coupling the EIC and the bridge circuitry is less than a distance between connectors electrically coupling the EIC and the PIC.

Example A13 includes the subject matter of any one of Examples A9-A12, wherein the optical elements of the glass block comprise one or more of a waveguide, a mirror, a collimator, and a focusing element.

Example A14 includes the subject matter of any one of Examples A9-A13, wherein the glass block comprises one or more receptacles to receive guide pins of a detachable fiber array unit.

Example A15 includes the subject matter of any one of Examples A9-A14, wherein the glass block is at least 600 um thick.

Example A16 is a system comprising: an integrated circuit package comprising: a package substrate; an electronic integrated circuit (EIC) coupled to the package substrate; a photonics integrated circuit (PIC) electrically coupled to the EIC; a glass block at least partially in a cavity defined by the package substrate and at an end of the package substrate; and a processor electrically coupled to the EIC; and a detachable fiber array unit (FAU) coupled to the integrated circuit package; wherein the glass block defines an optical path between the PIC and the detachable FAU.

Example A17 includes the subject matter of Example A16, wherein a bottom side of the EIC is coupled to a top side of the substrate, and a bottom side of the PIC is coupled to a top side of the EIC.

Example A18 includes the subject matter of Example A16 or A17, wherein the integrated circuit package further comprises bridge circuitry in the package substrate to electrically couple the EIC and the processor.

Example A19 includes the subject matter of Example A18, wherein a distance between connectors electrically coupling the EIC and the bridge circuitry is less than a distance between connectors electrically coupling the EIC and the PIC.

Example A20 includes the subject matter of any one of Examples A16-A19, wherein the optical elements of the glass block comprise one or more of a waveguide, a mirror, a collimator, and a focusing element.

Example A21 includes the subject matter of any one of Examples A16-A20, wherein the glass block comprises one or more receptacles to receive guide pins of a detachable fiber array unit.

Example A22 includes the subject matter of any one of Examples A16-A21, wherein the glass block is at least 600 um thick.

Example B1 is an integrated circuit device comprising: a substrate; an electronic integrated circuit (EIC); a photonics integrated circuit (PIC) electrically coupled to the EIC; and a glass block coupled to the PIC, the glass block defining an optical path with one or more optical elements to direct light between the PIC and an external surface of the glass block.

Example B2 includes the subject matter of Example B1, wherein a bottom side of the EIC is coupled to a top side of the substrate, a bottom side of the PIC is coupled to a top side of the EIC, and the glass block is coupled to a top side of the PIC.

Example B3 includes the subject matter of Example B1, wherein a bottom side of the EIC is coupled to a top side of the substrate, the glass block comprises through glass vias (TGVs) to electrically connect the EIC and the PIC, and the glass block is between the PIC and the EIC.

Example B4 includes the subject matter of any one of Examples B1-B3, further comprising bridge circuitry in the substrate to interconnect the EIC and other components of the integrated circuit device.

Example B5 includes the subject matter of Example B4, wherein a distance between connectors electrically coupling the EIC and the bridge circuitry is less than a distance between connectors electrically coupling the EIC and the PIC.

Example B6 includes the subject matter of Example B4 or B5, further comprising a processor electrically coupled to the EIC via the bridge circuitry.

Example B7 includes the subject matter of any one of Examples B1-B6, wherein the optical elements of the glass block comprise one or more of a waveguide, a mirror, a collimator, and a focusing element.

Example B8 includes the subject matter of any one of Examples B1-B7, wherein the glass block comprises one or more receptacles to receive guide pins of a detachable fiber array unit.

Example B9 includes the subject matter of any one of Examples B1-B8, wherein the glass block is at least 600 um thick.

Example B10 is an integrated circuit package comprising: a package substrate; an electronic integrated circuit (EIC) coupled to the package substrate; a photonics integrated circuit (PIC) electrically coupled to the EIC; and a glass block coupled to the PIC, the glass block defining an optical path with one or more optical elements to direct light between the PIC and an external surface of the glass block; and a processor electrically coupled to the EIC.

Example B11 includes the subject matter of Example B10, wherein a bottom side of the EIC is coupled to a top side of the substrate, a bottom side of the PIC is coupled to a top side of the EIC, and the glass block is coupled to a top side of the PIC.

Example B12 includes the subject matter of Example B10, wherein a bottom side of the EIC is coupled to a top side of the substrate, the glass block comprises through glass vias (TGVs) to electrically connect the EIC and the PIC, and the glass block is between the PIC and the EIC.

Example B13 includes the subject matter of any one of Examples B10-B12, further comprising bridge circuitry in the package substrate to electrically couple the EIC and the processor.

Example B14 includes the subject matter of any one of Examples B10-B13, wherein the optical elements of the glass block comprise one or more of a waveguide, a mirror, a collimator, and a focusing element.

Example B15 includes the subject matter of any one of Examples B10-B14, wherein the glass block comprises one or more receptacles to receive guide pins of a detachable fiber array unit.

Example B16 includes the subject matter of any one of Examples B10-B15, wherein the glass block is at least 600 um thick.

Example B17 is a system comprising: an integrated circuit package comprising: a package substrate; an electronic integrated circuit (EIC) coupled to the package substrate; a photonics integrated circuit (PIC) electrically coupled to the EIC; and a glass block coupled to the PIC, the glass block defining an optical path with one or more optical elements to direct light between the PIC and a an external surface of the glass block; and a processor electrically coupled to the EIC; and a detachable fiber array unit (FAU) coupled to the integrated circuit package.

Example B18 includes the subject matter of Example B17, wherein a bottom side of the EIC is coupled to a top side of the substrate, a bottom side of the PIC is coupled to a top side of the EIC, and the glass block is coupled to a top side of the PIC.

Example B19 includes the subject matter of Example B17, wherein a bottom side of the EIC is coupled to a top side of the substrate, the glass block comprises through glass vias (TGVs) to electrically connect the EIC and the PIC, and the glass block is between the PIC and the EIC.

Example B20 includes the subject matter of any one of Examples B17-B19, wherein the optical elements of the glass block comprise one or more of a waveguide, a mirror, a collimator, and a focusing element.

Example B21 includes the subject matter of any one of Examples B17-B20, wherein the glass block comprises one or more receptacles to receive guide pins of a detachable fiber array unit.

Example B22 includes the subject matter of any one of Examples B17-B21, wherein the glass block is at least 600 um thick.

Example C1 is an integrated circuit device comprising: a substrate; a photonics integrated circuit (PIC); a glass block coupled to the PIC, the glass block defining an optical path with one or more optical elements to direct light between the PIC and an external surface of the glass block; and interconnection circuitry to electronically couple components of the integrated circuit device, the interconnection circuitry comprising an electronic integrated circuit (EIC) electrically coupled to the PIC.

Example C2 includes the subject matter of Example C1, wherein the interconnection circuitry is bridge circuitry in the substrate.

Example C3 includes the subject matter of Example C2, further comprising a processor coupled to the substrate and electrically coupled to the EIC.

Example C4 includes the subject matter of Example C1, wherein the interconnection circuitry is an interposer coupled to the substrate and electrically coupled to the PIC through bridge circuitry in the substrate.

Example C5 includes the subject matter of Example C4, further comprising multiple processors coupled to the interconnection circuitry and electrically coupled to the EIC.

Example C6 includes the subject matter of any one of Examples C1-C5, wherein a bottom side of the PIC is coupled to a top side of the substrate and the glass block is coupled to a top side of the PIC.

Example C7 includes the subject matter of any one of Examples C1-C5, wherein the glass block comprises through glass vias (TGVs) to electrically connect the PIC and the EIC in the interconnection circuitry, and the glass block is between the PIC and the substrate.

Example C8 includes the subject matter of any one of Examples C1-C7, wherein the optical elements of the glass block comprise one or more of a waveguide, a mirror, a collimator, and a focusing element.

Example C9 includes the subject matter of any one of Examples C1-C8, wherein the glass block comprises one or more receptacles to receive guide pins of a detachable fiber array unit.

Example C10 includes the subject matter of any one of Examples C1-C9, wherein the glass block is at least 600 um thick.

Example C11 is an integrated circuit package comprising: a package substrate; a photonics integrated circuit (PIC) on the package substrate; a processor on the package substrate; bridge circuitry in the package substrate, the bridge circuitry comprising an electronic integrated circuit (EIC) electrically coupled to the PIC and the processor; and a glass block coupled to the PIC, the glass block defining an optical path with one or more optical elements to direct light between the PIC and an external surface of the glass block.

Example C12 includes the subject matter of Example C11, wherein a bottom side of the PIC is coupled to a top side of the substrate and the glass block is coupled to a top side of the PIC.

Example C13 includes the subject matter of Example C11, wherein the glass block comprises through glass vias (TGVs) to electrically connect the PIC and the EIC in the interconnection circuitry, and the glass block is between the PIC and the substrate.

Example C14 includes the subject matter of any one of Examples C11-C13, wherein the optical elements of the glass block comprise one or more of a waveguide, a mirror, a collimator, and a focusing element.

Example C15 includes the subject matter of any one of Examples C11-C14, wherein the glass block comprises one or more receptacles to receive guide pins of a detachable fiber array unit.

Example C16 is an integrated circuit package comprising: a package substrate; multiple processors; a photonics integrated circuit (PIC) on the package substrate; an active interposer on the package substrate, the active interposer comprising circuitry to interconnect the multiple processors and an electronic integrated circuit (EIC) electrically coupled to the PIC and the multiple processors; and a glass block coupled to the PIC, the glass block defining an optical path with one or more optical elements to direct light between the PIC and an external surface of the glass block.

Example C17 includes the subject matter of Example C16, wherein a bottom side of the PIC is coupled to a top side of the substrate and the glass block is coupled to a top side of the PIC.

Example C18 includes the subject matter of Example C16, wherein the glass block comprises through glass vias (TGVs) to electrically connect the PIC and the EIC in the interconnection circuitry, and the glass block is between the PIC and the substrate.

Example C19 includes the subject matter of any one of Examples C16-C18, wherein the optical elements of the glass block comprise one or more of a waveguide, a mirror, a collimator, and a focusing element.

Example C20 includes the subject matter of any one of Examples C16-C19, wherein the glass block comprises one or more receptacles to receive guide pins of a detachable fiber array unit.

Example C21 is a system comprising: an integrated circuit package comprising: a package substrate; a photonics integrated circuit (PIC) on the package substrate; a processor on the package substrate; bridge circuitry in the package substrate, the bridge circuitry comprising an electronic integrated circuit (EIC) electrically coupled to the PIC and the processor; and a glass block coupled to the PIC; and a detachable fiber array unit (FAU) coupled to the integrated circuit package; wherein the glass block defines an optical path with one or more optical elements to direct light between the PIC and the detachable FAU.

Example C22 includes the subject matter of Example C21, wherein a bottom side of the PIC is coupled to a top side of the substrate and the glass block is coupled to a top side of the PIC.

Example C23 includes the subject matter of Example C21, wherein the glass block comprises through glass vias (TGVs) to electrically connect the PIC and the EIC in the interconnection circuitry, and the glass block is between the PIC and the substrate.

Example C24 is a system comprising: an integrated circuit package comprising: a package substrate; multiple processors; a photonics integrated circuit (PIC) on the package substrate; an active interposer on the package substrate, the active interposer comprising circuitry to interconnect the multiple processors and an electronic integrated circuit (EIC) electrically coupled to the PIC and the multiple processors; and a glass block coupled to the PIC; and a detachable fiber array unit (FAU) coupled to the integrated circuit package; wherein the glass block defines an optical path with one or more optical elements to direct light between the PIC and the detachable FAU.

Example C25 includes the subject matter of Example C24, wherein a bottom side of the PIC is coupled to a top side of the substrate and the glass block is coupled to a top side of the PIC.

Example C26 includes the subject matter of Example C25, wherein the glass block comprises through glass vias (TGVs) to electrically connect the PIC and the EIC in the interconnection circuitry, and the glass block is between the PIC and the substrate.

Example C27 includes the subject matter of any one of Examples C21-C26, wherein the optical elements of the glass block comprise one or more of a waveguide, a mirror, a collimator, and a focusing element.

Example C28 includes the subject matter of any one of Examples C21-C27, wherein the glass block comprises one or more receptacles to receive guide pins of a detachable fiber array unit.

In the above description, various aspects of the illustrative implementations have been described using terms commonly employed by those skilled in the art to convey the substance of their work to others skilled in the art. However, it will be apparent to those skilled in the art that the present disclosure may be practiced with only some of the described aspects. For purposes of explanation, specific numbers, materials, and configurations have been set forth to provide a thorough understanding of the illustrative implementations. However, it will be apparent to one skilled in the art that the present disclosure may be practiced without all of the specific details. In other instances, well-known features have been omitted or simplified in order not to obscure the illustrative implementations.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "over," "under," "between," "above," and "on" as used herein may refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening features.

The above description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first feature formed, deposited, or otherwise disposed on a second feature" may mean that the first feature is formed, deposited, or disposed over the second feature, and at least a part of the first feature may be in direct contact (e.g., direct physical and/or electrical contact) or indirect contact (e.g., having one or more other features between the first feature and the second feature) with at least a part of the second feature.

In various embodiments, the phrase "located on" in the context of a first layer or component located on a second layer or component refers to the first layer or component being directly physically attached to the second part or component (no layers or components between the first and second layers or components) or physically attached to the second layer or component with one or more intervening layers or components.

In various embodiments, the term "adjacent" refers to layers or components that are in physical contact with each other. That is, there is no layer or component between the stated adjacent layers or components. For example, a layer X that is adjacent to a layer Y refers to a layer that is in physical contact with layer Y.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

The invention claimed is:

1. An integrated circuit device comprising:
a substrate;
an electronic integrated circuit (EIC);
a photonics integrated circuit (PIC) electrically coupled to the EIC; and
a glass block at least partially in a cavity defined by the substrate, the glass block defining an optical path with one or more optical elements to direct light between the PIC and an external surface of the glass block.

2. The integrated circuit device of claim 1, wherein a bottom side of the EIC is coupled to a top side of the substrate, and a bottom side of the PIC is coupled to a top side of the EIC.

3. The integrated circuit device of claim 1, further comprising bridge circuitry in the substrate to interconnect the EIC and other components of the integrated circuit device.

4. The integrated circuit device of claim 3, wherein a distance between connectors electrically coupling the EIC and the bridge circuitry is less than a distance between connectors electrically coupling the EIC and the PIC.

5. The integrated circuit device of claim 3, further comprising a processor electrically coupled to the EIC via the bridge circuitry.

6. The integrated circuit device of claim 1, wherein the optical elements of the glass block comprise one or more of a waveguide, a mirror, a collimator, and a focusing element.

7. The integrated circuit device of claim 1, wherein the glass block comprises one or more receptacles to receive guide pins of a detachable fiber array unit.

8. The integrated circuit device of claim 1, wherein the glass block is at least 600 um thick.

9. An integrated circuit package comprising:
a package substrate;
an electronic integrated circuit (EIC) coupled to the package substrate;
a photonics integrated circuit (PIC) electrically coupled to the EIC;
a glass block at least partially in a cavity defined by the package substrate, the glass block defining an optical path with one or more optical elements to direct light between the PIC and an external surface of the glass block; and
a processor electrically coupled to the EIC.

10. The integrated circuit package of claim 9, wherein a bottom side of the EIC is coupled to a top side of the substrate, and a bottom side of the PIC is coupled to a top side of the EIC.

11. The integrated circuit package of claim 9, further comprising bridge circuitry in the package substrate to electrically couple the EIC and the processor.

12. The integrated circuit package of claim 11, wherein a distance between connectors electrically coupling the EIC and the bridge circuitry is less than a distance between connectors electrically coupling the EIC and the PIC.

13. The integrated circuit package of claim 9, wherein the optical elements of the glass block comprise one or more of a waveguide, a mirror, a collimator, and a focusing element.

14. The integrated circuit package of claim 9, wherein the glass block comprises one or more receptacles to receive guide pins of a detachable fiber array unit.

15. The integrated circuit package of claim 9, wherein the glass block is at least 600 um thick.

16. A system comprising:
an integrated circuit package comprising:
a package substrate;
an electronic integrated circuit (EIC) coupled to the package substrate;
a photonics integrated circuit (PIC) electrically coupled to the EIC;
a glass block at least partially in a cavity defined by the package substrate and at an end of the package substrate; and
a processor electrically coupled to the EIC; and
a detachable fiber array unit (FAU) coupled to the integrated circuit package;
wherein the glass block defines an optical path between the PIC and the detachable FAU.

17. The system of claim 16, wherein a bottom side of the EIC is coupled to a top side of the substrate, and a bottom side of the PIC is coupled to a top side of the EIC.

18. The system of claim 16, wherein the integrated circuit package further comprises bridge circuitry in the package substrate to electrically couple the EIC and the processor.

19. The system of claim 18, wherein a distance between connectors electrically coupling the EIC and the bridge circuitry is less than a distance between connectors electrically coupling the EIC and the PIC.

20. The system of claim 16, wherein the optical path comprises one or more optical elements comprising one or more of a waveguide, a mirror, a collimator, and a focusing element.

21. The system of claim 16, wherein the FAU comprises guide pins and the glass block comprises receptacles to receive the guide pins of the detachable FAU.

22. The system of claim 16, wherein the glass block is at least 600 um thick.

* * * * *